US012428976B1

(12) United States Patent
Miller et al.

(10) Patent No.: US 12,428,976 B1
(45) Date of Patent: Sep. 30, 2025

(54) LUBRICATION SYSTEM FOR A TURBINE ENGINE

(71) Applicant: General Electric Company, Schenectady, NY (US)

(72) Inventors: Brandon W. Miller, Middletown, OH (US); Arthur W. Sibbach, Boxford, MA (US); Daniel A. Niergarth, Norwood, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/622,253

(22) Filed: Mar. 29, 2024

(51) Int. Cl.
*F01D 25/18* (2006.01)

(52) U.S. Cl.
CPC .......... *F01D 25/18* (2013.01); *F05D 2260/98* (2013.01)

(58) Field of Classification Search
CPC ........................................................ F01D 25/18
See application file for complete search history.

(56) References Cited

U.S. PATENT DOCUMENTS

| | | | | |
|---|---|---|---|---|
| 6,463,819 | B1 | 10/2002 | Rago | |
| 6,914,524 | B2 | 7/2005 | Berndorfer et al. | |
| 8,925,515 | B2 | 1/2015 | McMullen | |
| 9,909,453 | B2 | 3/2018 | Fang et al. | |
| 10,711,877 | B2 | 7/2020 | Fisher et al. | |
| 10,823,005 | B2 | 11/2020 | Fang et al. | |
| 2023/0349326 | A1* | 11/2023 | Turnquist | F02C 7/36 |

FOREIGN PATENT DOCUMENTS

| | | | |
|---|---|---|---|
| CN | 205334240 | U | 6/2016 |
| CN | 106043695 | A | 10/2016 |
| CN | 107782498 | A | 3/2018 |
| FR | 3088956 | B1 | 10/2020 |
| FR | 3127269 | A1 | 3/2023 |
| FR | 3130896 | A1 | 6/2023 |
| FR | 3130897 | A1 | 6/2023 |
| FR | 3133367 | A1 | 9/2023 |
| FR | 3133368 | A1 | 9/2023 |

OTHER PUBLICATIONS

Miller et al., U.S. Appl. No. 18/537,494, filed Dec. 12, 2023.

* cited by examiner

*Primary Examiner* — Brian O Peters
(74) *Attorney, Agent, or Firm* — Venable LLP; Duarte Y Ho; Michele V. Frank

(57) ABSTRACT

A lubrication system for a turbine engine that includes one or more rotating components. The lubrication system includes one or more tanks that store lubricant, a primary lubrication system, and an auxiliary lubrication system. The primary lubrication system supplies the lubricant from the one or more tanks to the one or more rotating components during stable operating conditions of the lubrication system. The auxiliary lubrication system includes an auxiliary feed line and an auxiliary supply line. The auxiliary lubrication system receives the lubricant from the one or more tanks through the auxiliary feed line. The auxiliary lubrication system supplies the lubricant to the one or more rotating components through the auxiliary supply line when there is a potential lubricant interruption in the lubrication system.

20 Claims, 8 Drawing Sheets

LUBRICATION SYSTEM FOR A TURBINE ENGINE

TECHNICAL FIELD

The present disclosure relates to lubrication systems, particularly, to lubrication systems for turbine engines.

BACKGROUND

Turbine engines generally include a fan and a core section arranged in flow communication with one another. The turbine engines include one or more rotating components that rotate or support rotation of other components of the turbine engine. A lubrication system provides a lubricant to the one or more rotating components.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, or structurally similar elements.

DETAILED DESCRIPTION

Figure 1:
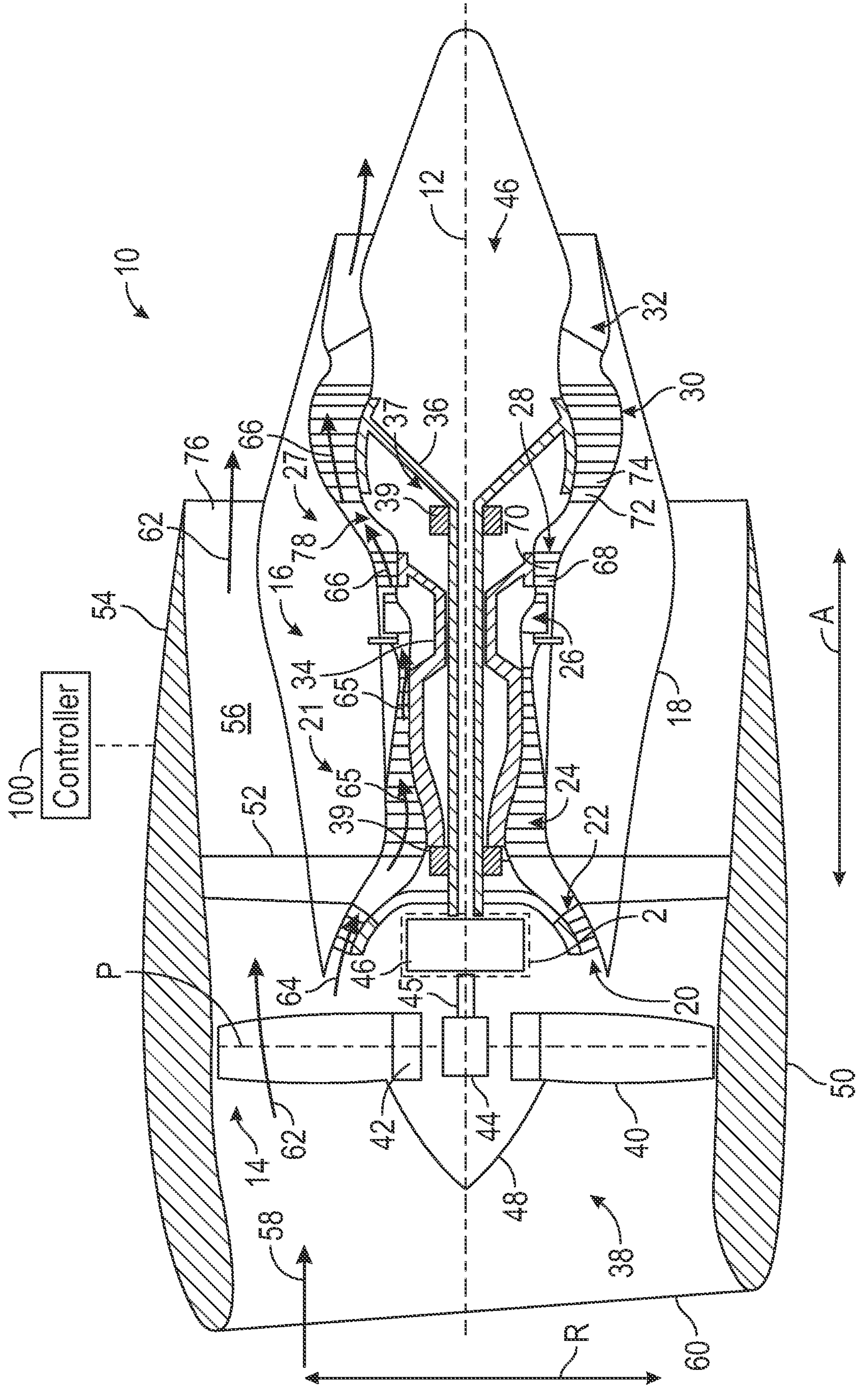
FIG. 1 is a schematic cross-sectional diagram of a turbine engine, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the present disclosure.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a high-bypass turbine engine, forward refers to a position closer to an engine inlet and aft refers to a position closer to an engine nozzle or exhaust. In one example, in a reverse flow turbine engine, forward refers to a position closer to the engine nozzle or exhaust and aft refers to a position closer to an engine inlet.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, "normal operation" of a turbine engine is intended to mean when the turbine engine is operating, and a primary lubrication system of the turbine engine is supplying lubricant to one or more rotating components of the turbine engine.

As used herein, "positive gravity conditions" occur when gravity experienced by the turbine engine is positive, such as when the turbine engine is subject to acceleration resulting from the combination of gravity and maneuver accelerations, having at least one vector component directed towards the bottom of the turbine engine. For example, positive gravity conditions occur when the turbine engine is parked on the ground, or during leveled, or substantially leveled, flight phases.

As used herein, "negative gravity," or "negative gravity conditions" occur when gravity experienced by the turbine engine is negative, such as when the turbine engine is subject to an acceleration resulting from the combination of gravity and maneuver accelerations, having at least one vector component directed towards the top of the turbine engine. For example, negative gravity conditions could occur when the turbine engine is accelerating toward the Earth at a rate equal to or greater than the rate of gravity, or decelerating at the end of a vertical ascent.

As used herein, "stable operating conditions" occur when the turbine engine is operating in positive gravity conditions and the primary lubrication system is supplying a lubricant to the one or more rotating components at a continuous pressure that is greater than a minimum lubricant pressure threshold. In this way, the primary lubrication system is able to adequately pump lubricant to the one or more rotating components. Thus, the lubricant in the one or more tanks is supplied to the pump during the stable operating conditions.

As used herein, "minimum lubricant pressure threshold" or "lubricant pressure threshold" is the minimum pressure supplied from the primary lubrication system to the one or more rotating components to balance the pressure across the rotating component (and seals thereof), to minimize the intrusion of air into the primary lubrication system, and to minimize the loss of lubricant through the seal. The minimum lubricant pressure threshold is based on an operating pressure of the primary lubrication system of the engine, which is dependent on the rotating component (e.g., based on the types of bearings) and based on the operating pressure ratio of the engine. The operating pressure ratio defines the pressure rating of the bearings and the seals. In examples where the rotating components are journal bearings, the minimum lubricant pressure threshold is also based on the design of the bearings, and the load on the bearings. In some examples, the minimum lubricant pressure threshold is about seventy five percent of normal operating pressure.

As used herein, "windmill" or "windmilling" is a condition when the fan and the low-pressure shaft of the turbine engine continue to rotate at low speeds, while the high-pressure shaft rotates slowly or even stops. Windmilling can occur when the turbine engine is shut down, but air still flows across the fan, such as during an in-flight engine shutdown or when the turbine engine is on the ground and the fan is rotating in the presence of wind when the turbine engine is shutdown. During a shutdown, e.g., while the aircraft is on the ground, the fan may also rotate in either direction depending upon the stationary position of the turbine engine relative to the ambient wind. Airflow entering the fan exhaust may exit the fan inlet in an opposite direction as a direction of operation and cause the fan to rotate in an opposite rotational direction compared to the intended operational rotational direction.

As used herein, a "check valve" is a one-way valve that allows a fluid to flow only in one direction through the check valve. The check valves detailed herein can include any type of valve for allowing the flow of a fluid to move in only one direction.

As used herein, a "control valve" is a valve used to control fluid flow by varying a size of a flow passage of the valve as directed by a signal from a controller. The control valves detailed herein can include any type of valve that is controlled by a controller.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components or the systems or manufacturing the components or the systems. For example, the approximating language may refer to being within a one, a two, a four, a ten, a fifteen, or a twenty percent margin in either individual values, range(s) of values, or endpoints defining range(s) of values.

The present disclosure provides for a turbine engine having a lubrication system. The turbine engine includes one or more rotating components that rotate within the turbine engine. The one or more rotating components can include, for example, one or more shafts, one or more gears, or one or more bearings including one or more engine bearings for the one or more shafts of the turbine engine (e.g., a low-pressure shaft or a high-pressure shaft) or one or more gear bearings for a gear assembly of the turbine engine. The one or more gear bearings allow rotation of the one or more gears of the gear assembly about the one or more gear bearings. In one embodiment, one or more of the bearings are journal bearings. The one or more bearings can include any type of bearings, such as, for example, roller bearings, or the like. The lubrication system supplies lubricant (e.g., oil) to the one or more rotating components. The lubrication system includes one or more tanks that store lubricant therein, and a primary lubrication system having a primary pump and a primary supply line. During normal operation of the turbine engine, the primary pump pumps the lubricant from the one or more tanks to the one or more rotating components through the primary supply line. The primary lubrication system typically requires positive gravity conditions to adequately pump the lubricant from the one or more tanks. For example, the lubricant flows through a bottom of the one or more tanks and gravity helps to maintain the lubricant in fluid communication with the pump. In this way, the pump pumps the lubricant and does not pump air within the one or more tanks.

The bearings, especially journal bearings, are hydrodynamic bearings that typically require a steady supply of lubricant during all operational phases of the turbine engine to properly lubricate the bearings to prevent damage due to sliding contact for hydrodynamic journal bearings or even for the generic gear mesh interface. The turbine engine may experience negative gravity conditions during operation of the turbine engine. For example, during negative gravity conditions, the lubricant will float up to the top of the one or more tanks, which interrupts the flow of the lubricant through the primary lubrication system. Similarly, the flow of the lubricant through the primary lubrication system can be interrupted by drastic maneuvers, such as, for example, collision avoidance, yaw of the aircraft, turbulence, flying through air pockets, or down drafts in the atmosphere. In such instances, the one or more rotating components, and, in particular, the one or more bearings, can be affected by not receiving enough lubricant for lubricating the one or more rotating components.

The criticality of the lubricant interruptions increases when the bearings are journal bearings, since the absence of lubricant at the journal bearings can lead to a journal bearing failure and subsequent gearbox failure, which may cause the low-speed shaft to lock up permanently. Such a failure of the journal bearings is referred to as a journal bearing seizure and occurs when there is contact between the planet pin and the bore of the gear, which causes an increase of wear and friction that leads to bearing failure. If contact occurs between the journal bearing and the pin during high-power operation, the two components can become welded together due to the high temperature from the friction. Even short lubricant interruptions (e.g., 30 milliseconds to 50 milliseconds) can cause journal bearing seizure.

Some turbine engines include an auxiliary lubrication system that supplies lubricant to the one or more rotating components to prevent damage to the rotating components due to inadequate lubricant supply. Such auxiliary lubrication systems, however, may have a delay in supplying the lubricant to the one or more components. For example, such auxiliary lubrication systems typically supply the lubricant after the primary lubrication system has lost pressure. In this way, such auxiliary lubrication systems are unable to avoid an interruption of the lubricant flow to the one or more rotating components.

Accordingly, the present disclosure provides an auxiliary lubrication system that supplies the lubricant to the one or more rotating components as the turbine engine approaches the negative gravity conditions to avoid any interruptions of the lubricant flow to the one or more rotating components. In some embodiments, the auxiliary lubrication system incorporates a tri-axial accelerometer for measuring the inertia of the turbine engine and a controller predicts potential lubricant pressure interruptions due to the negative gravity conditions. In some embodiments, the auxiliary lubrication system includes a gyroscope for measuring rotational forces acting upon the turbine engine and the lubrication system. The auxiliary lubrication system anticipates potential lubricant interruptions based on the prediction and supplies the lubricant to the one or more rotating components before the interruption actually occurs.

In one exemplary embodiment, the auxiliary lubrication system is an actively controlled system that is controlled by a controller. The controller determines the inertial and gravitational forces acting upon the turbine engine and the lubrication system for predicting lubricant interruptions in the primary lubrication system. During stable operating conditions (e.g., positive gravity conditions), the controller fills an auxiliary accumulator with lubricant and pressurizes the auxiliary accumulator with a pressure source. The pressure source can be pressurized air or can be an actuator in the auxiliary accumulator. The pressurized air is regulated to maintain a pressure of the auxiliary accumulator just below the pressure of the lubricant in the primary lubrication system. The actuator pushes the lubricant out of the auxiliary accumulator. The auxiliary accumulator includes a lubricant bladder that stores the lubricant therein. The lubricant bladder is coupled to the bottom of the auxiliary accumulator such that the lubricant bladder prevents that lubricant from floating to the top of the auxiliary accumulator. When the controller determines that the forces acting upon the turbine engine indicate a negative gravity condition that could interrupt the flow of the lubricant to the primary pump from the one or more tanks, the controller controls the auxiliary lubrication system to release the lubricant in the auxiliary accumulator. In this way, the auxiliary lubrication system supplies the lubricant to supplement the lubricant in the primary lubrication system before the interruption. Thus, the auxiliary lubrication system helps to avoid any lubricant interruptions.

In one exemplary embodiment, the auxiliary lubrication system is a semi-actively controlled system. The controller controls the auxiliary lubrication system to fill the auxiliary accumulator with the lubricant. The auxiliary lubrication system supplies the lubricant to the one or more rotating components passively without the controller controlling a valve or an actuator to force the lubricant out of the auxiliary accumulator. In this way, the auxiliary accumulator is charged by pressurizing the lubricant at a predetermined pressure. The auxiliary lubrication system supplies the lubricant to the one or more rotating components when the pressure of the lubricant in the primary lubrication system is less than the pressure of the lubricant in the auxiliary accumulator. In one exemplary embodiment, the auxiliary lubrication system is a passive system such that the lubricant is supplied to the auxiliary accumulator from the primary lubrication system without the use of the controller controlling components.

Referring now to the drawings, FIG. 1 is a schematic cross-sectional diagram of a turbine engine 10, taken along a longitudinal centerline axis 12 of the turbine engine 10, according to an embodiment of the present disclosure. As shown in FIG. 1, the turbine engine 10 defines an axial direction A (extending parallel to the longitudinal centerline axis 12 provided for reference) and a radial direction R that is normal to the axial direction A. In general, the turbine engine 10 includes a fan section 14 and a turbo-engine 16 disposed downstream from the fan section 14.

The turbo-engine 16 includes, in serial flow relationship, a compressor section 21, a combustion section 26, and a turbine section 27. The turbo-engine 16 is substantially enclosed within an outer casing 18 that is substantially tubular and defines a core inlet 20 that is annular. As schematically shown in FIG. 1, the compressor section 21 including a booster or a low pressure (LP) compressor 22 followed downstream by a high pressure (HP) compressor 24. The combustion section 26 is downstream of the compressor section 21. The turbine section 27 is downstream of the combustion section 26 and includes a high pressure (HP) turbine 28 followed downstream by a low pressure (LP) turbine 30. The turbo-engine 16 further includes a jet exhaust nozzle section 32 that is downstream of the turbine section 27, a high-pressure (HP) shaft 34 or an HP spool, and a low-pressure (LP) shaft 36 or an LP spool. The HP shaft 34 drivingly connects the HP turbine 28 to the HP compressor 24. The HP turbine 28 and the HP compressor 24 rotate in unison through the HP shaft 34. The LP shaft 36 drivingly connects the LP turbine 30 to the LP compressor 22. The LP turbine 30 and the LP compressor 22 rotate in unison through the LP shaft 36. The compressor section 21, the combustion section 26, the turbine section 27, and the jet exhaust nozzle section 32 together define a core air flow path.

The turbine engine 10 includes one or more rotating components 37 that are lubricated by a lubricant (e.g., oil) to support rotation of the one or more rotating components 37, as detailed further below. The HP shaft 34, the LP shaft 36, or both the HP shaft 34 and the LP shaft 36 are supported by one or more engine bearings 39 that allow the HP shaft 34 and the LP shaft 36 to rotate. The one or more engine bearings 39 can include any type of bearings, such as, for example, roller bearings, or the like. The turbine engine 10 can include any number of engine bearings 39 for supporting various rotating components within the turbine engine 10. In this way, the one or more rotating components 37 include the one or more engine bearings 39.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the plurality of fan blades 40 extends outwardly from the disk 42 generally along the radial direction R. In the case of a variable pitch fan, the plurality of fan blades 40 is rotatable relative to the disk 42 about a pitch axis P by virtue of the plurality of fan blades 40 being operatively coupled to an actuation member 44 configured to collectively vary the pitch of the fan blades 40 in unison, as detailed further below. The plurality of fan blades 40, the disk 42, and the actuation member 44 are together rotatable about the longitudinal centerline axis 12 via a fan shaft 45 that is powered by the LP shaft 36 across a power gearbox, also referred to as a gearbox assembly 46. In this way, the fan 38 is drivingly coupled to, and powered by, the turbo-engine 16, and the turbine engine 10 is an indirect drive engine. The gearbox assembly 46 is shown schematically in FIG. 1. The gearbox assembly 46 is a reduction gearbox assembly for adjusting the rotational speed of the fan shaft 45 and, thus, the fan 38 relative to the LP shaft 36 when power is transferred from the LP shaft 36 to the fan shaft 45.

Referring still to the exemplary embodiment of FIG. 1, the disk 42 is covered by a fan hub 48 that is aerodynamically contoured to promote an airflow through the plurality of fan blades 40. In one non-limiting embodiment, the fan section 14 includes an annular fan casing or a nacelle 50 that circumferentially surrounds the fan 38. In some embodiments, the nacelle 50 circumferentially surrounds at least a portion of the turbo-engine 16. The nacelle 50 is supported relative to the turbo-engine 16 by a plurality of outlet guide vanes 52 that are circumferentially spaced about the nacelle 50 and the turbo-engine 16. Moreover, a downstream section 54 of the nacelle 50 extends over an outer portion of the turbo-engine 16, and, with the outer casing 18, defines a bypass airflow passage 56 therebetween.

During operation of the turbine engine 10, a volume of air 58 enters the turbine engine 10 through an inlet 60 of the nacelle 50 or the fan section 14. As the volume of air 58 passes across the fan blades 40, a first portion of air, also referred to as bypass air 62, is routed into the bypass airflow passage 56, and a second portion of air, also referred to as core air 64, is routed into the upstream section of the core air flow path through the core inlet 20 of the LP compressor 22. The ratio between the bypass air 62 and the core air 64 is commonly known as a bypass ratio. The pressure of the core air 64 is then increased, generating compressed air 65. The compressed air 65 is routed through the HP compressor 24 and into the combustion section 26, where the compressed air 65 is mixed with fuel and ignited to generate combustion gases 66.

The combustion gases 66 are routed into the HP turbine 28 and expanded through the HP turbine 28 where a portion of thermal energy and kinetic energy from the combustion gases 66 is extracted via one or more stages of HP turbine stator vanes 68 and HP turbine rotor blades 70 that are coupled to the HP shaft 34. This causes the HP shaft 34 to rotate, which supports operation of the HP compressor 24 (self-sustaining cycle). In this way, the combustion gases 66 do work on the HP turbine 28. The combustion gases 66 are then routed into the LP turbine 30 and expanded through the LP turbine 30. Here, a second portion of the thermal energy and the kinetic energy is extracted from the combustion gases 66 via one or more stages of LP turbine stator vanes 72 and LP turbine rotor blades 74 that are coupled to the LP shaft 36. This causes the LP shaft 36 to rotate, which supports operation of the LP compressor 22 (self-sustaining cycle) and rotation of the fan 38 via the gearbox assembly 46. In this way, the combustion gases 66 do work on the LP turbine 30.

The combustion gases 66 are subsequently routed through the jet exhaust nozzle section 32 of the turbo-engine 16 to provide propulsive thrust. Simultaneously, the bypass air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the turbo-engine 16.

A controller 100 is in communication with the turbine engine 10 for controlling aspects of the turbine engine 10. For example, the controller 100 is in two-way communication with the turbine engine 10 for receiving signals from various sensors and control systems of the turbine engine 10 and for controlling components of the turbine engine 10, as detailed further below. The controller 100, or components thereof, may be located onboard the turbine engine 10, onboard the aircraft, or can be located remote from each of the turbine engine 10 and the aircraft. The controller 100 can be a Full Authority Digital Engine Control (FADEC) that controls aspects of the turbine engine 10.

The controller 100 may be a standalone controller or may be part of an engine controller to operate various systems of the turbine engine 10. In this embodiment, the controller 100 is a computing device having one or more processors and a memory. The one or more processors can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory can include one or more computer-readable media, including, but not limited to, non-transitory computer-readable media, a computer readable non-volatile medium (e.g., a flash memory), a RAM, a ROM, hard drives, flash drives, or other memory devices.

The memory can store information accessible by the one or more processors, including computer-readable instructions that can be executed by the one or more processors. The instructions can be any set of instructions or a sequence of instructions that, when executed by the one or more processors, cause the one or more processors and the controller 100 to perform operations. The controller 100 and, more specifically, the one or more processors are programmed or configured to perform these operations, such as the operations discussed further below. In some embodiments, the instructions can be executed by the one or more processors to cause the one or more processors to complete any of the operations and functions for which the controller 100 is configured, as will be described further below. The instructions can be software written in any suitable programming language or can be implemented in hardware. Additionally, or alternatively, the instructions can be executed in logically or virtually separate threads on the processors. The memory can further store data that can be accessed by the one or more processors.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. The turbine engine 10 may also be a direct drive engine, which does not have a power gearbox. The fan speed is the same as the LP shaft speed for a direct drive engine. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, open rotor engines, turbojet engines, turboprop, or turboshaft engines.

Figure 2:
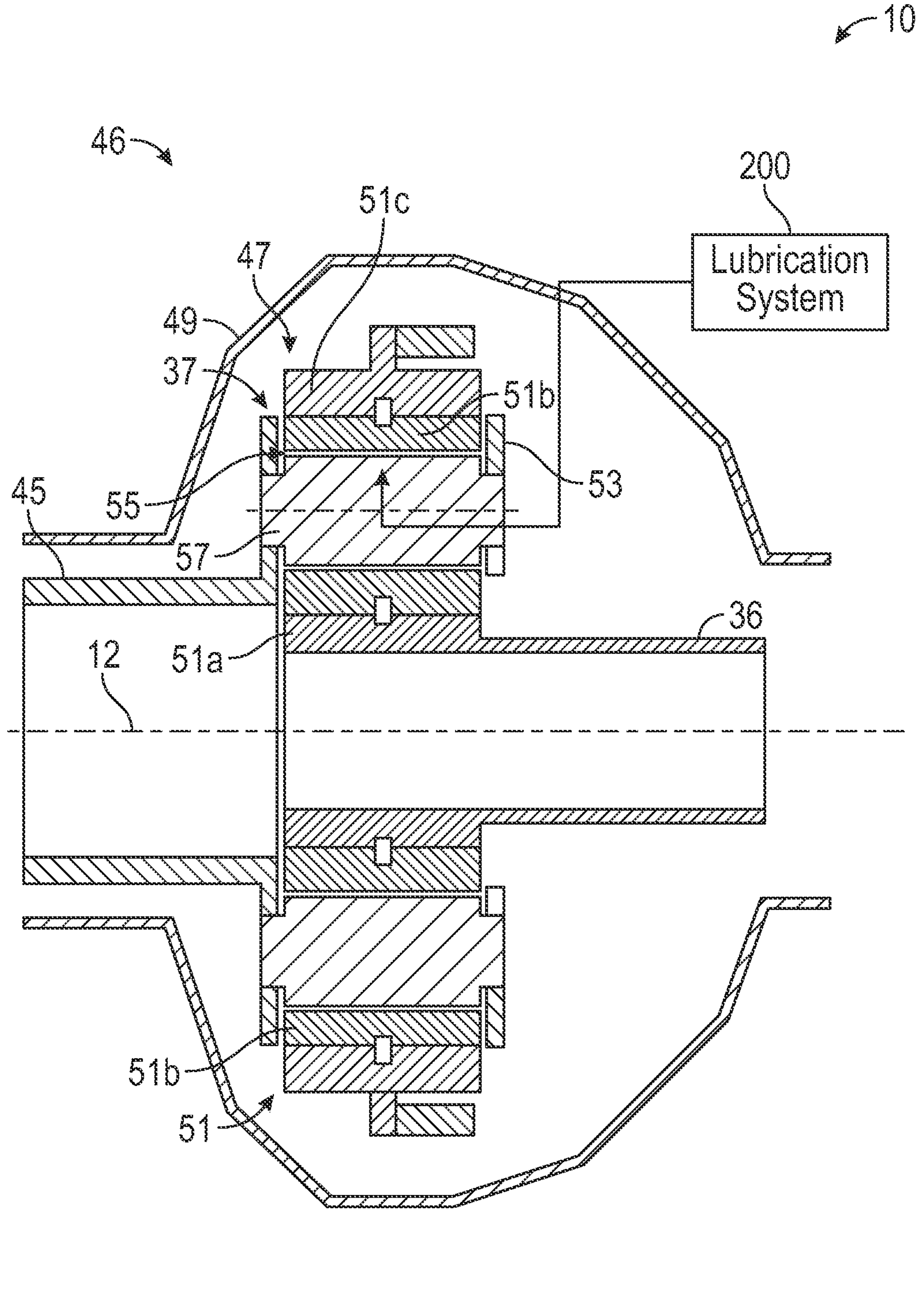
FIG. 2 is a schematic, cross-sectional side view of a gearbox assembly of the turbine engine of FIG. 1, taken at detail 2 in FIG. 1, according to the present disclosure.

FIG. 2 is a schematic, cross-sectional side view of the gearbox assembly 46 of the turbine engine 10, taken at detail 2 in FIG. 1, according to the present disclosure. The gearbox assembly 46 includes a gear assembly 47 enclosed by a gearbox casing 49. The gear assembly 47 includes a plurality of gears 51. The plurality of gears 51 includes a first gear 51*a*, one or more second gears 51*b* secured by a planet carrier 53, and a third gear 51*c*. In FIG. 2, the first gear 51*a* is a sun gear, the one or more second gears 51*b* are planet gears, and the third gear 51*c* is a ring gear. The gear assembly 47 can be an epicyclic gear assembly. When the gear assembly 47 is an epicyclic gear assembly, the one or more second gears 51*b* include a plurality of second gears 51*b* (e.g., two or more second gears 51*b*).

In the epicyclic gear assembly, the gear assembly 47 can be in a star arrangement or a rotating ring gear type gear assembly (e.g., the third gear 51*c* is rotating and the planet carrier 53 is fixed and stationary). In such an arrangement, the fan 38 (FIG. 1) is driven by the third gear 51*c*. For example, the third gear 51*c* is coupled to the fan shaft 45 such that rotation of the third gear 51*c* causes the fan shaft 45, and, thus, the fan 38, to rotate. In this way, the third gear 51*c* is an output of the gear assembly 47. However, other suitable types of gear assemblies may be employed. In one non-limiting embodiment, the gear assembly 47 is a planetary arrangement, in which the third gear 51*c* is held fixed, with the planet carrier 53 allowed to rotate. In such an arrangement, the fan 38 is driven by the planet carrier 53. For example, the planet carrier 53 is coupled to the fan shaft 45 such that rotation of the planet carrier 53 causes the fan shaft 45, and, thus, the fan 38, to rotate. In this way, the one or more second gears 51*b* (e.g., via the planet carrier 53) are the output of the gear assembly 47. In another non-limiting embodiment, the gear assembly 47 may be a differential gear assembly in which the third gear 51*c* and the planet carrier 53 are both allowed to rotate. While an epicyclic gear assembly is detailed herein, the gear assembly can include any type of gear assembly including, for example, a compound gear assembly, a multiple stage gear assembly, a gear assembly for driving a propeller, a gear assembly for driving accessories of the turbine engine 10 or accessories of the aircraft, or the like.

The first gear 51*a* is coupled to an input shaft of the turbine engine 10. For example, the first gear 51*a* is coupled to the LP shaft 36 such that rotation of the LP shaft 36 causes the first gear 51*a* to rotate. Radially outward of the first gear 51*a*, and intermeshing therewith, are the one or more second gears 51*b* that are coupled together and supported by the planet carrier 53. The planet carrier 53 supports and constrains the one or more second gears 51*b* such that the each of the one or more second gears 51*b* is enabled to rotate about a corresponding axis of each second gear 51*b* without rotating about the periphery of the first gear 51*a*. Radially outwardly of the one or more second gears 51*b*, and intermeshing therewith, is the third gear 51*c*, which is an annular ring gear. The third gear 51*c* is coupled via an output shaft to the fan 38 and rotates to drive rotation of the fan 38 about the longitudinal centerline axis 12. For example, the fan shaft 45 is coupled to the third gear 51*c*.

The plurality of gears 51 includes one or more gear bearings 55 disposed therein. For example, the one or more second gears 51*b* each includes one or more gear bearings 55 disposed therein. The one or more gear bearings 55 enable the plurality of gears 51 to rotate about the one or more gear bearings 55 such that the plurality of gears 51 rotates. The one or more gear bearings 55 can include any type of bearing for a gear, such as, for example, journal bearings, roller bearings, or the like. In FIG. 2, the one or more gear bearings 55 are journal bearings that are defined between the one or more second gears 51*b* and a pin 57 that is disposed through the one or more second gears 51*b*. For example, the lubricant is provided between the pin 57 and a respective second gear 51*b* such that a lubricant film is generated to allow the respective second gear 51*b* to rotate with respect to the pin 57. The plurality of gears 51 and the one or more gear bearings 55 are rotating components of the turbine engine 10. In some embodiments, the one or more rotating components 37 include one or more shafts (e.g., the HP shaft 34, the LP shaft 36, or the fan shaft 45) of the turbine engine 10. Accordingly, the one or more rotating components 37 include at least one of the one or more shafts 34, 36, 45, the one or more engine bearings 39, the plurality of gears 51, or the one or more gear bearings 55.

The turbine engine 10 includes a lubrication system 200 for supplying the lubricant to the one or more rotating components 37, as detailed further below. The lubrication system 200 can embody any of the lubrication systems detailed herein. The lubricant can include any type of lubricant for lubricating the one or more rotating components 37 of the turbine engine 10.

In operation, the LP shaft 36 rotates, as detailed above, and causes the first gear 51*a* to rotate. The first gear 51*a*, being intermeshed with the one or more second gears 51*b*, causes the one or more second gears 51*b* to rotate about their corresponding axis of rotation. The one or more second gears 51*b* rotate with respect to the one or more gear bearings 55 within the planet carrier 53. When the gear assembly 47 is the star arrangement, the one or more second gears 51*b*, being intermeshed with the third gear 51*c*, cause the third gear 51*c* to rotate about the longitudinal centerline axis 12. In such embodiments, the planet carrier 53 remains stationary such that the one or more second gears 51*b* do not rotate about the longitudinal centerline axis 12. When the gear assembly 47 is the planetary arrangement, the third gear 51*c* is stationary, and the planet carrier 53, and the one or more second gears 51*b*, rotate about the longitudinal centerline axis 12. When the gear assembly 47 is the differential gear assembly, both the planet carrier 53 (e.g., the one or more second gears 51*b*) and the third gear 51*c* rotate about the longitudinal centerline axis 12.

At the same time, the one or more engine bearings 39 rotate to allow rotation of the LP shaft 36, the fan shaft 45, or the HP shaft 34 (FIG. 1). In this way, the one or more rotating components 37 rotate. As the rotating components 37 rotate, the lubrication system 200 supplies the lubricant to the one or more rotating components 37 to lubricate the one or more rotating components 37. As mentioned above, the one or more rotating components 37 require a supply of the lubricant to support rotation of the one or more rotating components 37 without interruptions (e.g., during negative gravity conditions). Accordingly, the lubrication system 200 supplies the lubricant to the one or more rotating components 37 prior to the negative gravity conditions, as detailed further below.

Figure 3:
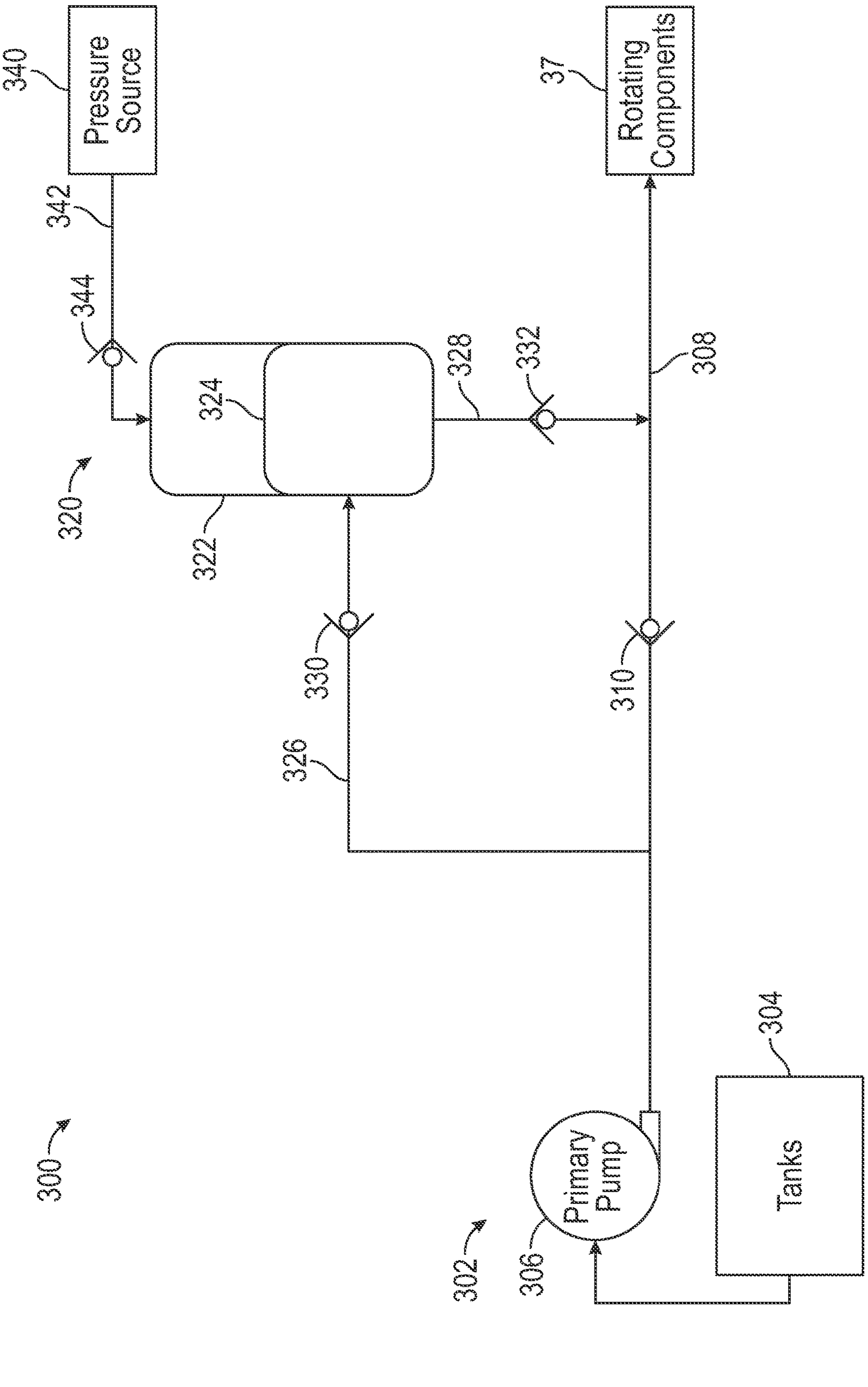
FIG. 3 is a schematic view of a lubrication system for the turbine engine of FIG. 1, according to the present disclosure.

FIG. 3 is a schematic view of a lubrication system 300 for the turbine engine 10 (FIG. 1), according to the present disclosure. The lubrication system 300 can be utilized as the lubrication system 200 of FIG. 2. The lubrication system 300 includes a primary lubrication system 302, one or more tanks 304, and an auxiliary lubrication system 320. The primary lubrication system 302 includes a primary pump 306 and a primary supply line 308. The one or more tanks 304 store the lubricant therein. The primary supply line 308 is in fluid communication with the one or more tanks 304 and the one or more rotating components 37 for supplying the lubricant from the one or more tanks 304 to the one or more rotating components 37. The primary pump 306 is in fluid communication with the primary supply line 308 to pump the lubricant from the one or more tanks 304 to the one or more rotating components 37 through the primary supply line 308.

The primary lubrication system 302 includes a primary supply line check valve 310 in fluid communication with the primary supply line 308. The primary supply line check valve 310 is disposed downstream of the one or more tanks 304 (e.g., downstream of the primary pump 306) and upstream of the one or more rotating components 37. The primary supply line check valve 310 allows the lubricant to flow from the one or more tanks 304 to the one or more rotating components 37 when a pressure of the lubricant in the primary supply line 308 upstream of the primary supply line check valve 310 is greater than a pressure of the lubricant in the primary supply line 308 downstream of the primary supply line check valve 310. The primary supply line check valve 310 prevents the lubricant from flowing from the one or more tanks 304 to the one or more rotating components 37 when the pressure of the lubricant in the primary supply line 308 upstream of the primary supply line check valve 310 is less than or equal to the pressure of the lubricant in the primary supply line 308 downstream of the primary supply line check valve 310.

The auxiliary lubrication system 320 includes an auxiliary accumulator 322 that includes a lubricant bladder 324 therein. The auxiliary accumulator 322 stores the lubricant therein. In particular, the lubricant bladder 324 stores the lubricant therein. The lubricant bladder 324 is coupled to a bottom of the auxiliary accumulator 322 such that the lubricant bladder 324 prevents the lubricant from moving to a top of the auxiliary accumulator 322 during negative gravity conditions. The lubricant bladder 324 has a lubricant bladder volume that is less than an auxiliary accumulator volume of the auxiliary accumulator 322. The lubricant bladder 324 is made of a material that is expandable such that the lubricant bladder 324 expands as the lubricant fills the lubricant bladder 324, and the lubricant bladder 324 contracts as the lubricant drains from the lubricant bladder 324.

The auxiliary accumulator volume of the auxiliary accumulator 322 is less than a tank volume of the one or more tanks 304. In this way, the auxiliary accumulator 322 stores less lubricant therein as compared to the one or more tanks 304. For example, the auxiliary accumulator volume is in a range of 3% to 25% of the tank volume. In one embodiment, the auxiliary accumulator volume is equal to or less than ten percent (10%) of the tank volume. The auxiliary accumulator 322 is sized to provide enough lubricant to the one or more rotating components 37 during the negative gravity conditions while minimizing the size of the auxiliary accumulator 322 to reduce the weight of the auxiliary accumulator 322, and, thus, to reduce the weight of the turbine engine 10 (FIG. 1) compared to turbine engines that use an additional pump (e.g., a fan-driven pump or an electrical pump). For example, negative gravity typically occurs for a short period of time such that the auxiliary accumulator 322 only needs to store a small amount of lubricant to supply the lubricant to the one or more rotating components 37 during the negative gravity conditions to prevent damage to the one or more rotating components 37 (e.g., journal bearing seizure). As used in this paragraph, a "short period of time" is related to the time period that an aircraft, for example, may experience a rapid drop in altitude due to ambient weather conditions (e.g., air pockets, down drafts, or wind shear events). In some examples, the short period of time is less than twenty seconds. In some examples, the short period of time is less than three seconds. In some examples, the short period of time is from three seconds to eighteen seconds. As used in this paragraph, a "small amount of lubricant" is the volume of lubricant that flows through the system during the short period of time (e.g., from three seconds to eighteen seconds).

The auxiliary lubrication system includes an auxiliary feed line 326 and an auxiliary supply line 328. The auxiliary feed line 326 is in fluid communication with the primary supply line 308 and the auxiliary accumulator 322 (e.g., the lubricant bladder 324) for supplying the lubricant from the primary supply line 308 to the auxiliary accumulator 322. The auxiliary feed line 326 is fluidly coupled to the primary supply line 308 upstream of the primary supply line check valve 310 and downstream of the one or more tanks 304. The auxiliary supply line 328 is in fluid communication with the auxiliary accumulator 322 (e.g., the lubricant bladder 324) and the primary supply line 308. The auxiliary supply line 328 is fluidly coupled to the primary supply line 308 downstream of the primary supply line check valve 310 and upstream of the one or more rotating components 37. In this way, the auxiliary accumulator 322 (e.g., the lubricant bladder 324) is in fluid communication with the primary supply line 308 upstream of the primary supply line check valve 310 to receive the lubricant from the primary supply line 308. The auxiliary accumulator 322 (e.g., the lubricant bladder 324) is in fluid communication with the primary supply line 308 downstream of the primary supply line check valve 310 to supply the lubricant from the auxiliary accumulator 322 to the one or more rotating components 37 through the primary supply line 308. While the auxiliary feed line 326 and the auxiliary supply line 328 are illustrated as separate components from the primary supply line 308, the auxiliary feed line 326 or the auxiliary supply line 328 can form a portion of the primary supply line 308.

The auxiliary lubrication system 320 includes an auxiliary feed line check valve 330 in fluid communication with the auxiliary feed line 326. The auxiliary feed line check valve 330 is disposed within the auxiliary feed line 326. The auxiliary feed line check valve 330 allows the lubricant to flow from the primary supply line 308 to the auxiliary accumulator 322 through the auxiliary feed line 326 when a pressure of the lubricant in the primary supply line 308 is greater than a pressure of the lubricant in the auxiliary accumulator 322. The auxiliary feed line check valve 330 prevents the lubricant from flowing from the primary supply line 308 to the auxiliary accumulator 322 when the pressure of the lubricant in the primary supply line 308 is less than or equal to the pressure of the lubricant in the auxiliary accumulator 322.

The auxiliary lubrication system 320 includes an auxiliary supply line check valve 332 in fluid communication with the auxiliary supply line 328. The auxiliary supply line check valve 332 is disposed within the auxiliary supply line 328. The auxiliary supply line check valve 332 allows the lubricant to flow from the auxiliary accumulator 322 to the one or more rotating components 37 through the auxiliary feed line 326 (e.g., and through the primary supply line 308) when a pressure of the lubricant in the auxiliary accumulator 322 is greater than a pressure of the lubricant in the primary supply line 308. The auxiliary supply line check valve 332 prevents the lubricant from flowing from the auxiliary accumulator 322 to the one or more rotating components 37 when the pressure of the lubricant in the auxiliary accumulator 322 is less than or equal to the pressure of the lubricant in the primary supply line 308.

The auxiliary lubrication system 320 includes a pressure source 340 for supplying pressurized air to the auxiliary accumulator 322. In this way, the pressure source 340 pressurizes the lubricant within the auxiliary accumulator 322. The pressure source 340 can be any type of pressure source for supplying pressurized air to the auxiliary accumulator 322. In one embodiment, the pressure source 340 is the HP compressor 24 (FIG. 1) and the HP compressor 24 supplies bleed air to the auxiliary accumulator 322. The pressure source 340 includes a pressurized air supply line 342 and a pressure source check valve 344 in fluid communication with the pressurized air supply line 342. The pressure source 340 supplies the pressurized air to the auxiliary accumulator 322 through the pressurized air supply line 342. The pressure source check valve 344 helps to regulate the pressure of the pressurized air to the auxiliary accumulator 322. In this way, the pressure source 340 pressurizes the lubricant in the auxiliary accumulator 322 to an auxiliary lubricant pressure. The auxiliary lubricant pressure is less than a primary lubricant pressure of the lubricant in the primary lubrication system 302. For example, the auxiliary lubricant pressure is in a range of 75% to 95% of the primary lubricant pressure (e.g., of a minimum operating primary lubricant pressure in the primary lubrication system 302).

In operation, the lubrication system 300 supplies the lubricant to the one or more rotating components 37 to lubricate the one or more rotating components 37. During normal operation of the turbine engine 10, the primary lubrication system 302 supplies the lubricant to the one or more rotating components 37. For example, the primary pump 306 pumps the lubricant from the one or more tanks 304 to the one or more rotating components 37 through the primary supply line 308. During the normal operation (and stable operating conditions), the pressure of the lubricant in the primary lubrication system 302 causes the primary supply line check valve 310 to open, and, therefore, the primary supply line 308 supplies the lubricant from the one or more tanks 304 to the one or more rotating components 37.

At the same time, the auxiliary feed line 326 supplies a portion of the lubricant from the primary lubrication system 302 to the auxiliary accumulator 322 to fill the auxiliary accumulator 322 with the portion of the lubricant. When the auxiliary accumulator 322 is not full of the portion of the lubricant, the auxiliary feed line check valve 330 opens to allow the lubricant to flow from the primary supply line 308 to the auxiliary accumulator 322. Under such conditions, the primary lubricant pressure of the lubricant in the primary lubrication system 302 (e.g., upstream of the primary supply line check valve 310) is greater than the auxiliary lubricant pressure of the lubricant in the auxiliary accumulator 322. Thus, the portion of the lubricant fills the auxiliary accumulator 322 during the normal operation of the turbine engine 10 (e.g., during the stable operating conditions of the lubrication system 300). In particular, the portion of the lubricant fills the lubricant bladder 324 such that the lubricant bladder expands within the auxiliary accumulator 322.

The portion of the lubricant fills the auxiliary accumulator 322 until a level of the portion of the lubricant in the auxiliary accumulator 322 is equal to a predetermined auxiliary lubricant level. The predetermined auxiliary lubricant level can be when the auxiliary accumulator 322 is full (e.g., approximately 100% capacity of the auxiliary accumulator 322) or when the lubricant bladder 324 is full (e.g., approximately 100% capacity of the lubricant bladder 324). The pressure source 340 supplies the pressurized air to the auxiliary accumulator 322 to pressurize the portion of the lubricant in the auxiliary accumulator 322. When the level of the portion of the lubricant in the auxiliary accumulator 322 is equal to the predetermined auxiliary lubricant level, the auxiliary feed line check valve 330 closes such that no additional lubricant is able to flow into the auxiliary accumulator 322. In this way, the auxiliary accumulator 322 is passively pressurized by the pressurized air from the pressure source 340.

When there is a potential lubricant interruption (e.g., during negative gravity conditions) in the lubrication system 300 (e.g., in the primary lubrication system 302), the lubrication system 300 may be unable to supply the lubricant to the one or more rotating components 37. For example, when a negative gravity condition occurs, the primary lubrication system 302 may be unable to supply the lubricant from the one or more tanks 304 to the one or more rotating components 37. In such conditions, the primary lubricant pressure of the lubricant in the primary lubrication system 302 reduces as there is not enough lubricant within the primary supply line 308 to be supplied to the one or more rotating components 37. As mentioned above, the one or more rotating components 37 can become damaged if there is not enough lubricant supplied to the one or more rotating components 37.

The auxiliary lubrication system 320 supplies the lubricant to the one or more rotating components 37 when there is a potential lubricant interruption in lubrication system 300 (e.g., in the primary lubrication system 302). For example, the auxiliary lubrication system 320 supplies the lubricant to the one or more rotating components when the primary lubricant pressure in the primary lubrication system 302 is less than the auxiliary lubricant pressure in the auxiliary accumulator 322. In such conditions, the auxiliary accumulator 322 supplies the portion of the lubricant from the auxiliary accumulator 322 to the one or more rotating components 37. For example, the auxiliary supply line check valve 332 opens due to the auxiliary lubricant pressure of the lubricant in the auxiliary accumulator 322 being greater than the primary lubricant pressure of the lubricant in the primary lubrication system 302 (e.g., within the primary supply line 308). The portion of the lubricant flows through the auxiliary supply line 328, through the auxiliary supply line check valve 332, into the primary supply line 308 and to the one or more rotating components 37. The auxiliary lubricant pressure of the lubricant from the auxiliary accumulator 322 causes the primary supply line check valve 310 to close to prevent the portion of the lubricant from flowing towards the one or more tanks 304. When the auxiliary accumulator 322 is empty or is otherwise not full and the turbine engine 10 is operating in positive gravity conditions, the auxiliary accumulator 322 fills with the portion of the lubricant, as detailed above.

Accordingly, the auxiliary lubrication system 320 supplies the portion of the lubricant to the one or more rotating components 37 when the primary lubricant pressure in the primary lubrication system 302 is less than the auxiliary lubricant pressure in the auxiliary accumulator 322. In this way, the auxiliary lubrication system 320 supplies the portion of the lubricant to the one or more rotating components 37 when there is a potential lubricant interruption in the lubrication system 300. Thus, the auxiliary lubrication system 320 avoids interruptions of the lubricant supplied to the one or more rotating components 37.

Figure 4:
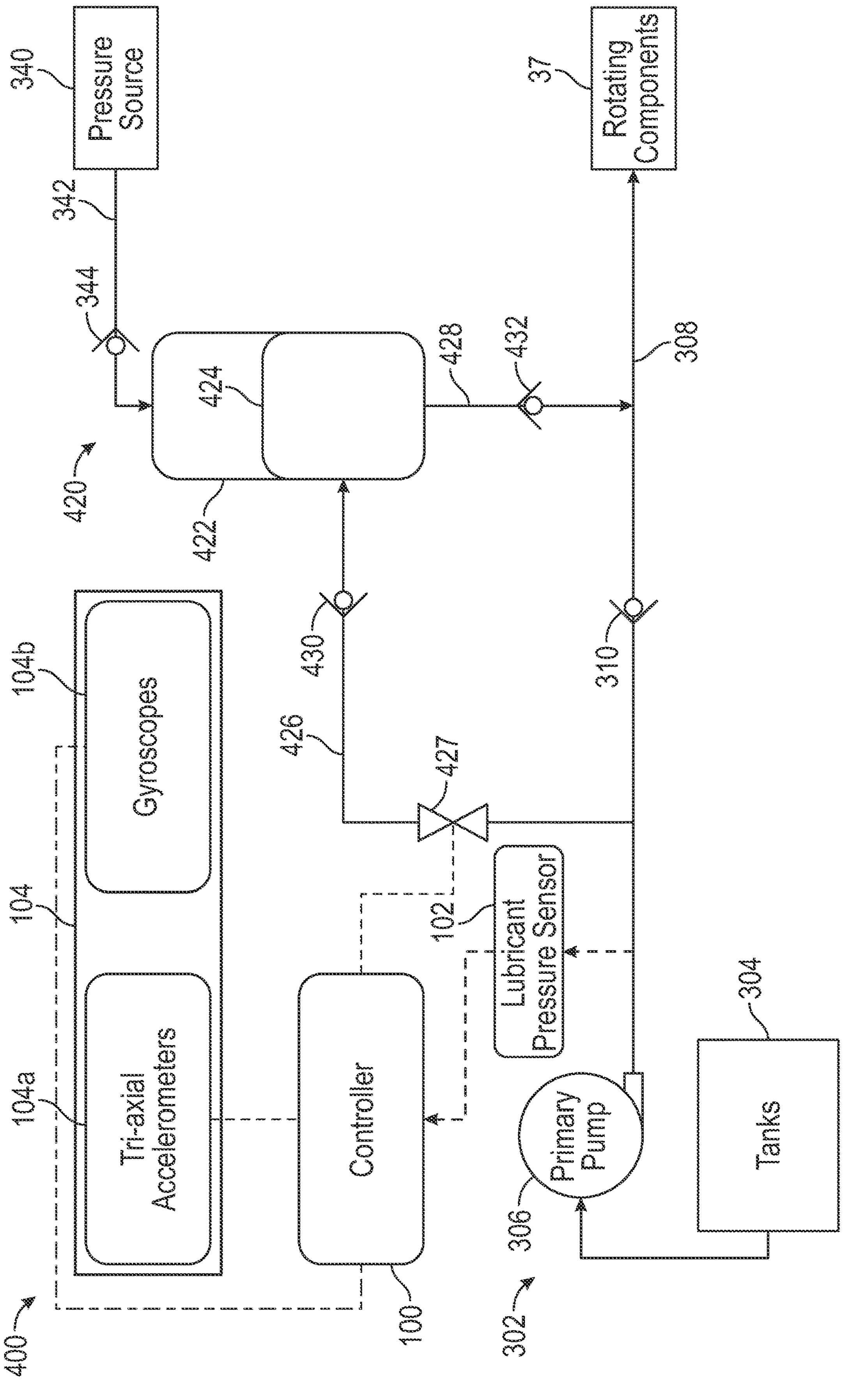
FIG. 4 is a schematic view of a lubrication system for the turbine engine of FIG. 1, according to another embodiment.

FIG. 4 is a schematic view of a lubrication system 400 for the turbine engine 10 (FIG. 1), according to another embodiment. The lubrication system 400 is substantially similar to the lubrication system 300 of FIG. 3. The same or similar reference numerals will be used for components of the lubrication system 400 that are the same as or similar to the components of the lubrication system 300 discussed above.

The description of these components above also applies to this embodiment, and a detailed description of these components is omitted here.

The lubrication system 400 includes the primary lubrication system 302 and an auxiliary lubrication system 420. The auxiliary lubrication system 420 includes an auxiliary accumulator 422, a lubricant bladder 424, an auxiliary feed line 426, an auxiliary supply line 428, an auxiliary feed line check valve 430, and an auxiliary supply line check valve 432. The auxiliary lubrication system 420 also includes auxiliary feed line control valve 427. The auxiliary feed line control valve 427 is in fluid communication with the auxiliary feed line 426 and is disposed upstream of the auxiliary feed line check valve 430. The auxiliary feed line control valve 427 is controlled to be opened to allow the portion of the lubricant to flow from the primary supply line 308 to the auxiliary accumulator 422. The auxiliary feed line control valve 427 is controlled to be closed to prevent the lubricant from flowing from the primary supply line 308 to the auxiliary accumulator 422.

The auxiliary lubrication system 420 includes the controller 100, a lubricant pressure sensor 102, and one or more inertial sensors 104. The lubricant pressure sensor 102 is in communication with the primary lubrication system 302 to sense the primary lubricant pressure in the primary lubrication system 302. For example, the lubricant pressure sensor 102 is in communication with the primary supply line 308 downstream of the primary pump 306 and upstream of the primary supply line check valve 310. The one or more inertial sensors 104 are disposed about the turbine engine 10 for sensing inertia, or angular rate and acceleration of motion, of the turbine engine 10. In FIG. 4, the one or more inertial sensors 104 include at least one of one or more tri-axial accelerometers 104*a* or one or more gyroscopes 104*b*. The one or more tri-axial accelerometers 104*a* are sensors that sense gravitational forces on the turbine engine 10 in three perpendicular axes. The one or more gyroscopes 104*b* sense rotational forces of the turbine engine 10. The one or more gyroscopes 104*b* can be single axis gyroscopes or tri-axial gyroscopes. The controller 100 is in communication with the lubricant pressure sensor 102, the one or more inertial sensors 104, and the auxiliary feed line control valve 427.

The lubrication system 400 operates substantially similarly as does the lubrication system 300. The controller 100 determines whether the lubrication system 400 (e.g., the primary lubrication system 302) is operating in a stable operating condition or there is a potential lubricant interruption in the lubrication system 400 (e.g., the primary lubrication system 302). The controller 100 receives sensed inertia of the turbine engine 10 from the one or more inertial sensors 104. The controller 100 determines an operating condition of the turbine engine 10 based on the sensed inertia. For example, the controller 100 determines whether the turbine engine 10 is operating in positive gravity conditions or whether the turbine engine 10 is approaching negative gravity conditions. The controller 100 determines that the turbine engine 10 is operating in positive gravity conditions if the sensed inertia indicates that the gravity experienced by the turbine engine is positive. In this way, positive gravity conditions occur when a net gravity vector of the turbine engine 10 is downwards. The controller 100 determines that the turbine engine 10 is approaching negative gravity conditions if the sensed inertia indicates that the gravity experience by the turbine engine 10 is approaching zero such that the net gravity vector is approaching zero (e.g., reducing in size from downwards towards zero). The negative gravity conditions occur when the net gravity vector is negative (e.g., less than zero and upwards).

The controller 100 controls the auxiliary feed line control valve 427 to open such that the portion of the lubricant flows from the primary supply line 308 to the auxiliary accumulator 422 if the primary lubrication system 302 is operating in the stable operating conditions (e.g., the turbine engine 10 is operating in positive gravity conditions). The pressure source 340 pressurizes the portion of the lubricant in the auxiliary accumulator 422, as detailed above. When the auxiliary accumulator 422 (e.g., the lubricant bladder 424) is full, the controller 100 controls the auxiliary feed line control valve 427 to close to prevent the lubricant from flowing from the primary supply line 308 to the auxiliary accumulator 422. The auxiliary lubrication system 420 supplies the portion of the lubricant from the auxiliary accumulator 422 to the one or more rotating components 37 when there is a potential lubricant interruption in the lubrication system 400 (e.g., as the turbine engine 10 approaches the negative gravity conditions, as detailed above). In this way, the lubrication system 400 actively controls the auxiliary lubrication system 420 (e.g., the auxiliary feed line control valve 427) to fill the auxiliary accumulator 422. The auxiliary lubrication system 420 supplies the portion of the lubricant from the auxiliary accumulator 422 to the one or more rotating components passively 37 (e.g., no active control from the controller 100) by use of the pressurized air within the auxiliary accumulator 422 that pressurizes the portion of the lubricant in the auxiliary accumulator 422 when there is a potential lubricant interruption in the lubrication system 400.

In some embodiments, the controller 100 controls the auxiliary feed line control valve 427 to open such that the portion of the lubricant flows from the primary supply line 308 to the auxiliary accumulator 422 when the turbine engine 10 (FIG. 1) is in the stable operating condition or is equal to or greater than an idle condition. In this way, the lubrication system 400 supplies the portion of the lubricant to the auxiliary accumulator 422 to fill the auxiliary accumulator 422 with the portion of the lubricant during the stable operating conditions, rather than during an engine start sequence The lubricant pressure in the primary lubrication system 302 will not be sufficient to supply the lubricant to the one or more rotating components 37 during the engine start sequence if the portion of the lubricant is supplied to the auxiliary accumulator 422 during the engine start sequence. In such instances, the one or more rotating components 37 will be starved of lubricant and may become damaged. Thus, the lubrication system 400 supplies the portion of the lubricant to the auxiliary accumulator 422 when the turbine engine 10 is at or above the idle condition to ensure an adequate lubricant supply to the one or more rotating components 37 during the engine start sequence. Such a configuration also ensures that the lubricant pressure of the portion of the lubricant in the auxiliary accumulator 422 is greater than an auxiliary lubricant pressure threshold (e.g., at least 75% to 95% of the lubricant pressure of the lubricant in the primary lubrication system 302) for supplying the portion of the lubricant from the auxiliary accumulator 422 to the one or more rotating components 37 during the negative gravity conditions. In some embodiments, the lubrication system 400 supplies the portion of the lubricant to the auxiliary accumulator 422 when a rotational speed of the turbo-engine 16 (FIG. 1) is greater than a rotational speed threshold to further ensure there is adequate lubricant supply to the one or more rotating components 37 during the engine start sequence to lubricate the rotating components

37. The rotational speed threshold is a rotational speed of the turbine engine that is below the speed required for air flow through the core of the engine to drive the fan or the LP shaft such that the fan and the LP shaft overcome inertia and friction to begin rotating. For example, the rotational speed threshold may be five percent to fifteen percent of the rated speed of the turbine engine core.

When the auxiliary accumulator 422 is empty or is otherwise not full and the turbine engine 10 is operating in positive gravity conditions, the auxiliary accumulator 422 fills with the portion of the lubricant, as detailed above. The controller 100 also receives the sensed lubricant pressure in the primary lubrication system 302 from the lubricant pressure sensor 102. The controller 100 determines that the lubricant in the auxiliary accumulator 422 has been at least partially used based on the lubricant pressure being less than a lubricant pressure threshold. The controller 100 then controls the auxiliary feed line control valve 427 to open such that the portion of the lubricant flows from the primary supply line 308 to the auxiliary accumulator 422 to refill the auxiliary accumulator 422 with the portion of the lubricant (e.g., if the primary lubrication system 302 is operating in the stable operating conditions). The controller 100 can also display an indication of the lubricant pressure on a display to a user (e.g., a pilot or a copilot in the aircraft or a user on the ground) to indicate that there is a malfunction or a loss of lubricant pressure in the lubrication system 400 or that maintenance is required.

Figure 5:
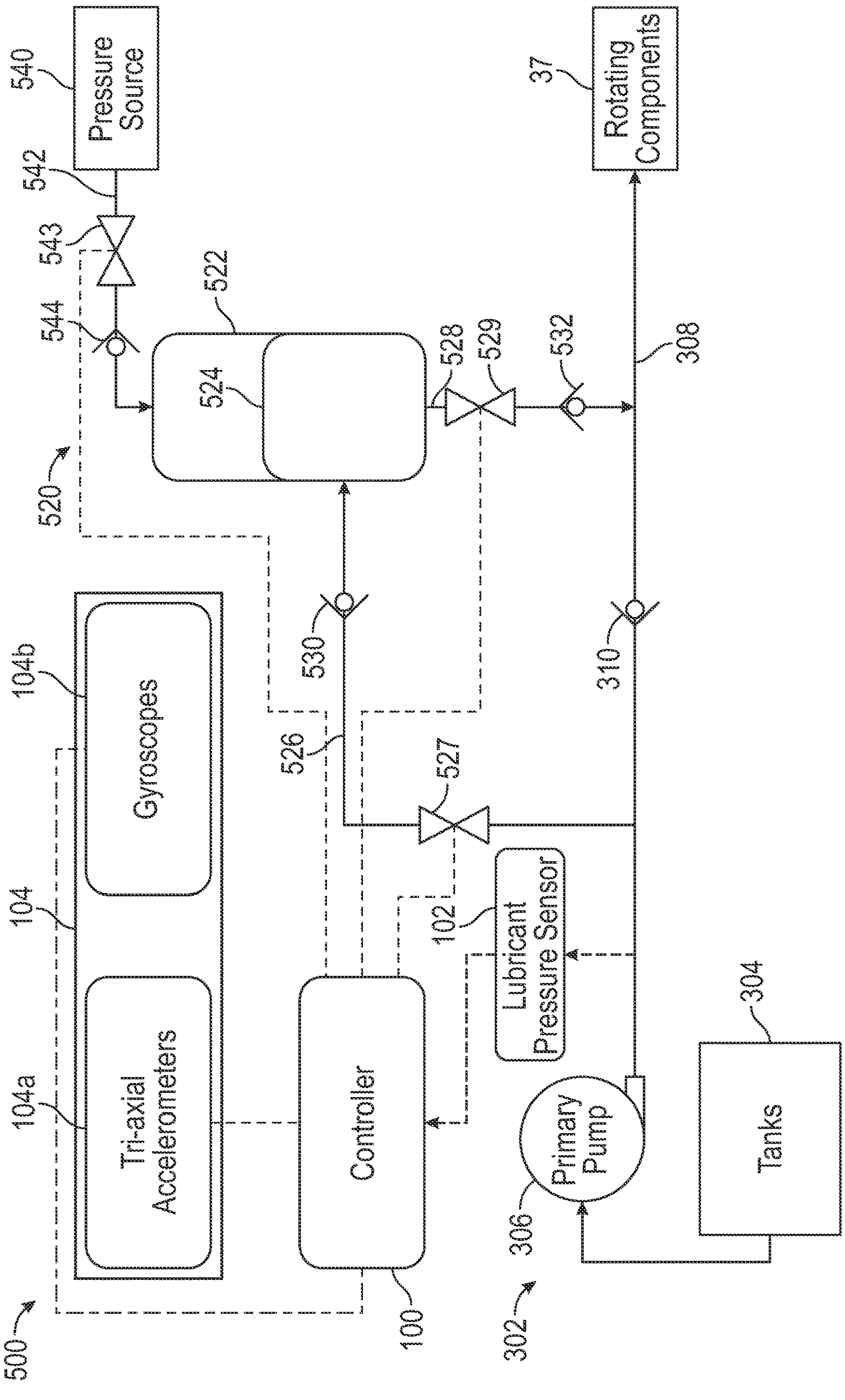
FIG. 5 is a schematic view of a lubrication system for the turbine engine of FIG. 1, according to another embodiment.

FIG. 5 is a schematic view of a lubrication system 500 for the turbine engine 10 (FIG. 1), according to another embodiment. The lubrication system 500 is substantially similar to the lubrication systems 300, 400 of FIGS. 3 and 4, respectively. The same or similar reference numerals will be used for components of the lubrication system 500 that are the same as or similar to the components of the lubrication systems 300, 400 discussed above. The description of these components above also applies to this embodiment, and a detailed description of these components is omitted here.

The lubrication system 500 includes the primary lubrication system 302 and an auxiliary lubrication system 520. The auxiliary lubrication system 520 includes an auxiliary accumulator 522, a lubricant bladder 524, an auxiliary feed line 526, an auxiliary supply line 528, an auxiliary feed line check valve 530, and an auxiliary supply line check valve 532. The auxiliary lubrication system 520 also includes an auxiliary feed line control valve 527 and an auxiliary supply line control valve 529.

The auxiliary feed line control valve 527 is in fluid communication with the auxiliary feed line 526 and is disposed upstream of the auxiliary feed line check valve 530. The auxiliary feed line control valve 527 is controlled to be opened to allow the portion of the lubricant to flow from the primary supply line 308 to the auxiliary accumulator 522. The auxiliary feed line control valve 527 is controlled to be closed to prevent the lubricant from flowing from the primary supply line 308 to the auxiliary accumulator 522.

The auxiliary supply line control valve 529 is in fluid communication with the auxiliary supply line 528 and is disposed upstream of the auxiliary supply line check valve 532. The auxiliary supply line control valve 529 is controlled to be opened to allow the portion of the lubricant to flow from the auxiliary accumulator 522 to the one or more rotating components 37 through the auxiliary supply line 528 and the primary supply line 308. The auxiliary supply line control valve 529 is controlled to be closed to prevent the lubricant from flowing from the auxiliary accumulator 522 to the one or more rotating components 37.

The auxiliary lubrication system 520 includes a pressure source 540, a pressurized air supply line 542, a pressure source control valve 543, and a pressure source check valve 544. The pressure source control valve 543 is in fluid communication with the pressurized air supply line 542 and is disposed upstream of the pressure source check valve 544. The pressure source control valve 543 is controlled to be opened to allow the pressurized air to flow from the pressure source 540 to the auxiliary accumulator 522. The pressure source control valve 543 is controlled to be closed to prevent the pressurized air from flowing from the pressure source 540 to the auxiliary accumulator 522. The pressure source control valve 543 can be controlled to be partially opened (e.g., to vary a size of a passageway of the pressure source control valve 543) to vary a flow rate of the pressurized air from the pressure source 540 to the auxiliary accumulator 522.

The auxiliary lubrication system 520 includes the controller 100, the lubricant pressure sensor 102, and the one or more inertial sensors 104. The controller 100 is in communication with the lubricant pressure sensor 102, the one or more inertial sensors 104, the auxiliary feed line control valve 527, the auxiliary supply line control valve 529, and the pressure source control valve 543.

The lubrication system 500 operates substantially similarly as do the lubrication systems 300, 400. The controller 100 determines whether the lubrication system 500 is operating in a stable operating condition or there is a potential lubricant interruption in the lubrication system 500. For example, the controller 100 determines whether the turbine engine 10 is operating in positive gravity conditions or whether the turbine engine 10 is approaching negative gravity conditions, as detailed above. The controller 100 controls the auxiliary feed line control valve 527 to open such that the portion of the lubricant flows from the primary supply line 308 to the auxiliary accumulator 522 if the lubrication system 500 is operating in the stable operating conditions (e.g., if the turbine engine 10 is operating in positive gravity conditions). The pressure source 540 pressurizes the portion of the lubricant in the auxiliary accumulator 522, as detailed above. When the auxiliary accumulator 522 (e.g., the lubricant bladder 524) is full, the controller 100 controls the auxiliary feed line control valve 527 to close to prevent the lubricant from flowing from the primary supply line 308 to the auxiliary accumulator 522.

The controller 100 controls the pressure source control valve 543 to vary an air pressure of the pressurized air that is supplied to the auxiliary accumulator 522. In this way, the controller 100 controls the auxiliary lubricant pressure in the auxiliary accumulator 522 such that the auxiliary lubricant pressure is less than the primary lubricant pressure. The controller 100 controls the pressure source control valve 543 to maintain the auxiliary lubricant pressure to be less than the primary lubricant pressure. For example, the controller 100 controls the pressure source control valve 543 to maintain the auxiliary lubricant pressure to be in a range of 75% to 95% of the primary lubricant pressure.

The auxiliary lubrication system 520 supplies the portion of the lubricant from the auxiliary accumulator 522 to the one or more rotating components 37 when there is a potential lubricant interruption in the lubrication system 500. For example, the auxiliary lubrication system 520 supplies the portion of the lubricant from the auxiliary accumulator 522 to the one or more rotating components 37 as the turbine engine 10 approaches the negative gravity conditions. The controller 100 controls the auxiliary supply line control valve 529 to open such that the portion of the lubricant flows from the auxiliary accumulator 522 (e.g., from the lubricant bladder 524) to the one or more rotating components 37 (e.g., through the auxiliary supply line 528 and the primary supply line 308) when there is a potential lubricant interruption in the lubrication system 500 (e.g., if the turbine engine 10 is approaching negative gravity conditions). The controller 100 controls the auxiliary supply line control valve 529 to close to prevent the lubricant from flowing from the auxiliary accumulator 522 to the one or more rotating components 37 when the lubrication system 500 is operating in the stable operating conditions (e.g., if the turbine engine 10 is operating in positive gravity conditions). In this way, the lubrication system 400 actively controls the auxiliary lubrication system 520 (e.g., the auxiliary supply line control valve 529) to supply the portion of the lubricant from the auxiliary accumulator 522 to the one or more rotating components 37 when there is a potential lubricant interruption in the lubrication system 500 (e.g., when the turbine engine 10 approaches the negative gravity conditions). When the auxiliary accumulator 522 is empty or is otherwise not full and the lubrication system 500 is operating in stable operating conditions (e.g., the turbine engine 10 is operating in positive gravity conditions), the auxiliary accumulator 522 fills with the portion of the lubricant, as detailed above.

Figure 6:
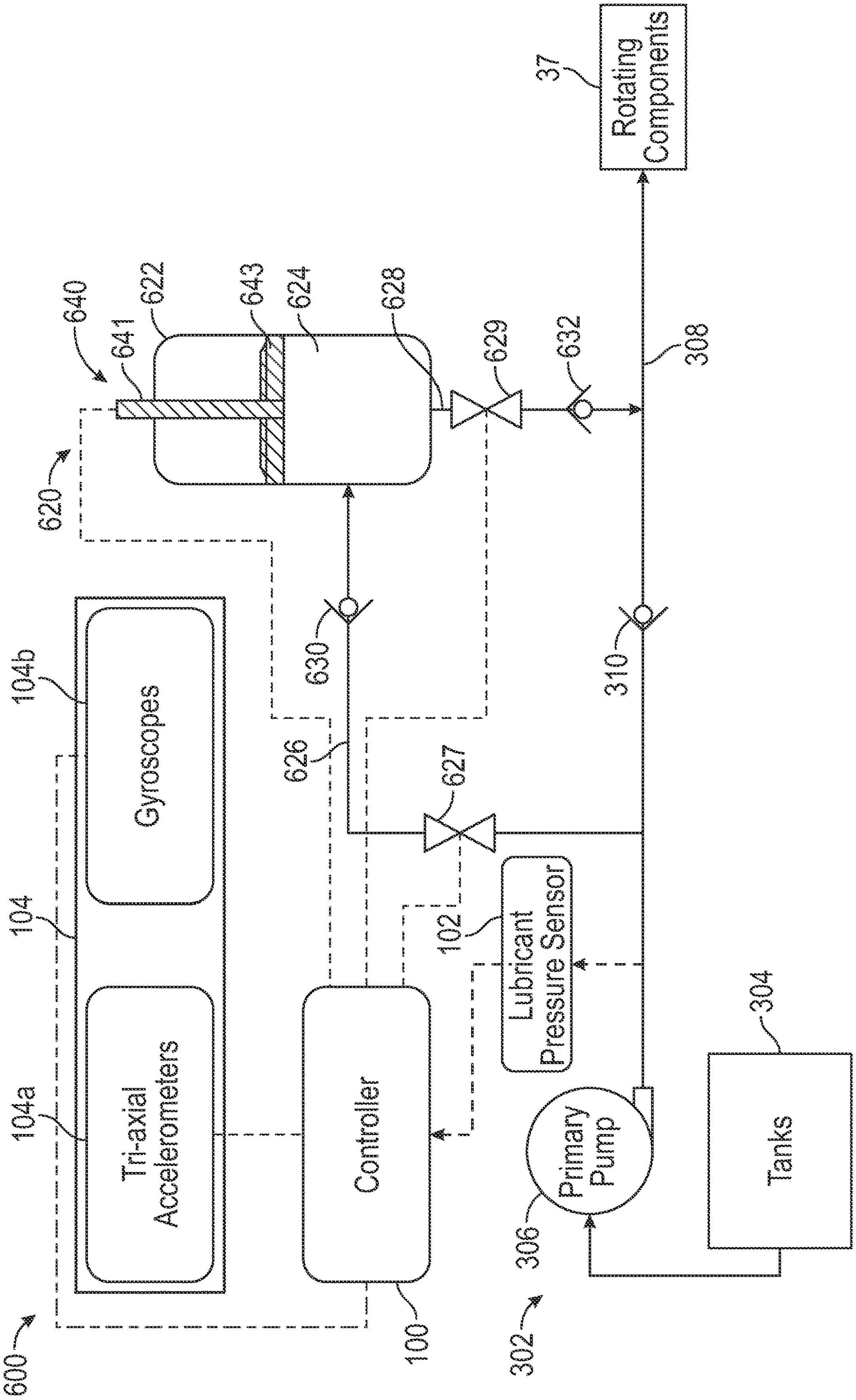
FIG. 6 is a schematic view of a lubrication system for the turbine engine of FIG. 1, according to another embodiment.

FIG. 6 is a schematic view of a lubrication system 600 for the turbine engine 10 (FIG. 1), according to another embodiment. The lubrication system 600 is substantially similar to the lubrication systems 300, 500 of FIGS. 3 and 5, respectively. The same or similar reference numerals will be used for components of the lubrication system 600 that are the same as or similar to the components of the lubrication systems 300, 500 discussed above. The description of these components above also applies to this embodiment, and a detailed description of these components is omitted here.

The lubrication system 600 includes the primary lubrication system 302 and an auxiliary lubrication system 620. The auxiliary lubrication system 620 includes an auxiliary accumulator 622, a lubricant bladder 624, an auxiliary feed line 626, an auxiliary supply line 628, an auxiliary feed line check valve 630, and an auxiliary supply line check valve 632. The auxiliary lubrication system 620 also includes an auxiliary feed line control valve 627 and an auxiliary supply line control valve 629.

The auxiliary lubrication system 620 includes a pressure source 640. The pressure source 640 is an actuator 641 that is disposed within the auxiliary accumulator 622. The actuator 641 is controlled to reciprocate (e.g., up and down) within the auxiliary accumulator 622 to pressurize the portion of the lubricant in the auxiliary accumulator 622. The actuator 641 includes a diaphragm 643 that contacts the portion of the lubricant in the auxiliary accumulator 622. In particular, the actuator 641 is controlled to reciprocate down such that the diaphragm 643 contacts the portion of the lubricant (e.g., contacts the lubricant bladder 624) to exert a force on the portion of the lubricant in the auxiliary accumulator 622. In this way, the actuator 641 pressurizes the portion of the lubricant in the auxiliary accumulator 622.

The auxiliary lubrication system 620 includes the controller 100, the lubricant pressure sensor 102, and the one or more inertial sensors 104. The controller 100 is in communication with the lubricant pressure sensor 102, the one or more inertial sensors 104, the auxiliary feed line control valve 627, the auxiliary supply line control valve 629, and the actuator 641.

The lubrication system 600 operates substantially similar to the lubrication systems 300, 500. The controller 100 determines whether the lubrication system 600 is operating in stable operating conditions or there is a potential lubricant interruption in the lubrication system 600, as detailed above. When the auxiliary accumulator 622 is full with the portion of the lubricant, the controller 100 controls the actuator 641 to reciprocate down to apply a pressure on the portion of the lubricant in the auxiliary accumulator 622. In this way, the controller 100 controls the auxiliary lubricant pressure in the auxiliary accumulator 622 such that the auxiliary lubricant pressure is less than the primary lubricant pressure. The controller 100 controls the actuator 641 to maintain the auxiliary lubricant pressure to be less than the primary lubricant pressure. For example, the controller 100 controls the actuator 641 to maintain the auxiliary lubricant pressure to be in a range of 75% to 95% of the primary lubricant pressure.

The auxiliary lubrication system 620 supplies the portion of the lubricant from the auxiliary accumulator 622 to the one or more rotating components 37 when there is a potential lubricant interruption in the lubrication system 600. The controller 100 controls the auxiliary supply line control valve 629 to open such that the portion of the lubricant flows from the auxiliary accumulator 622 (e.g., from the lubricant bladder 624) to the one or more rotating components 37 (e.g., through the auxiliary supply line 628 and the primary supply line 308) if there is a potential lubricant interruption in the lubrication system 600. The controller 100 also controls the actuator 641 to reciprocate down to continue to apply the pressure on the portion of the lubricant in the auxiliary accumulator 622 to force the portion of the lubricant out of the auxiliary accumulator 622 and to the one or more rotating components 37. The controller 100 controls the auxiliary supply line control valve 629 to close to prevent the lubricant from flowing from the auxiliary accumulator 622 to the one or more rotating components 37 if the lubrication system 600 is operating in the stable operating conditions. In this way, the lubrication system 600 actively controls the auxiliary lubrication system 620 (e.g., the auxiliary supply line control valve 629) to supply the portion of the lubricant from the auxiliary accumulator 622 to the one or more rotating components 37 when there is a potential lubricant interruption in the lubrication system 600 (e.g., in the primary lubrication system 302). When the auxiliary accumulator 622 is empty or is otherwise not full and the lubrication system 600 is operating in the stable operating conditions, the controller 100 controls the actuator 641 to reciprocate up and the auxiliary accumulator 622 fills with the portion of the lubricant, as detailed above.

Figure 7:
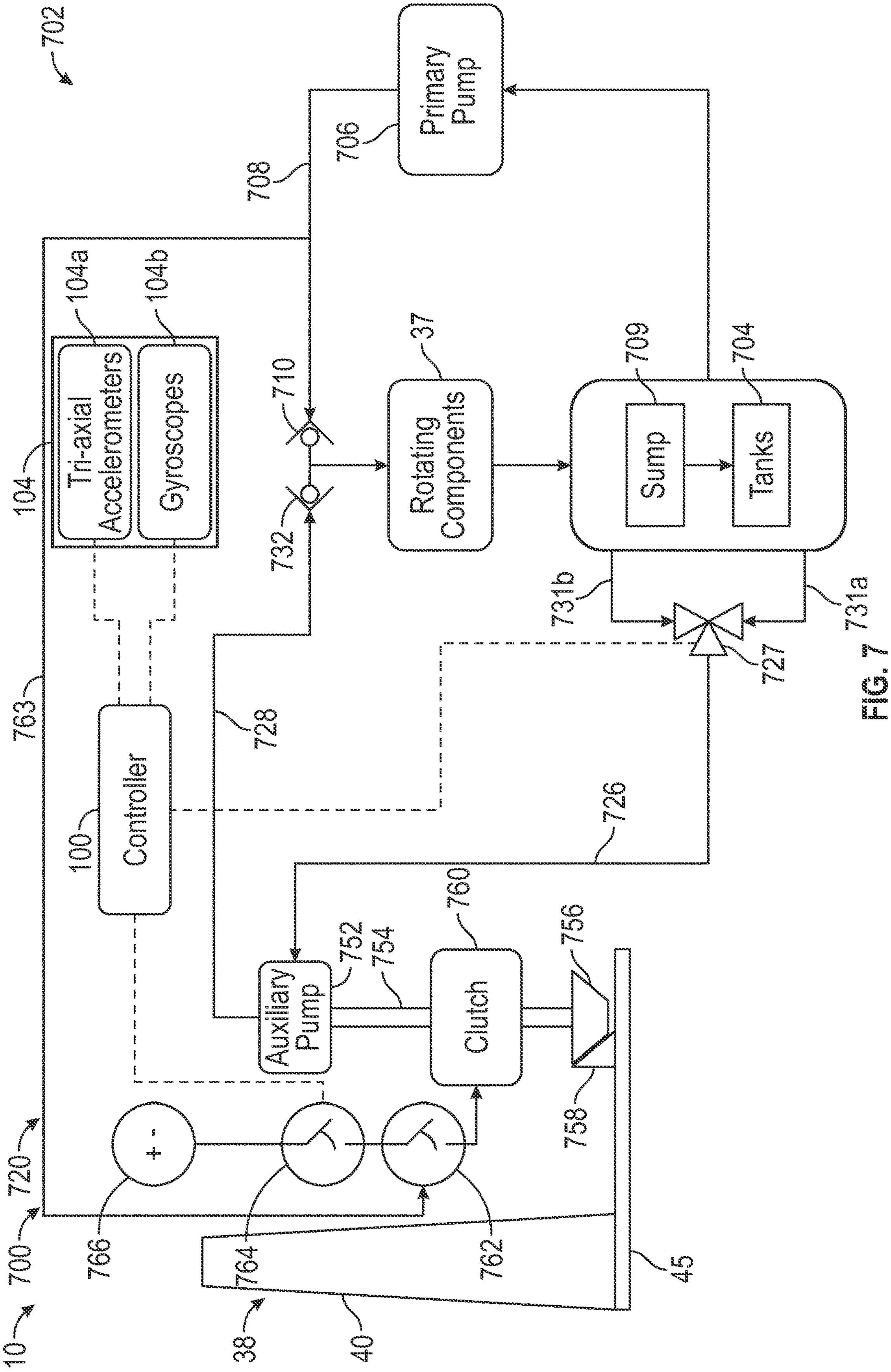
FIG. 7 is a schematic view of a lubrication system for the turbine engine of FIG. 1, according to another embodiment.

FIG. 7 is a schematic view of a lubrication system 700 for the turbine engine 10 (FIG. 1), according to another embodiment. The lubrication system 700 is substantially similar to the lubrication system 500 of FIG. 5. The same or similar reference numerals will be used for components of the lubrication system 700 that are the same as or similar to the components of the lubrication system 500 discussed above. The description of these components above also applies to this embodiment, and a detailed description of these components is omitted here.

The lubrication system 700 includes a primary lubrication system 702, one or more tanks 704, a sump 709, and an auxiliary lubrication system 720. The primary lubrication system 702 includes a primary pump 706, a primary supply line 708, and a primary supply line check valve 710. The auxiliary lubrication system 720 includes an auxiliary feed line 726, an auxiliary feed line control valve 727, an auxiliary supply line 728, and an auxiliary supply line check valve 732. The auxiliary lubrication system 720 includes the controller 100, and the one or more inertial sensors 104.

The auxiliary lubrication system 720 includes an auxiliary pump 752. The auxiliary pump 752 is coupled to the fan shaft 45. For example, the auxiliary pump 752 includes a pump shaft 754 that is coupled to the fan shaft 45. The pump shaft 754 includes a pump shaft gear 756 and the fan shaft 45 includes a fan shaft gear 758. The pump shaft gear 756 is intermeshed with the fan shaft gear 758 such that rotation of the fan shaft 45 causes the pump shaft 754 to rotate, which powers the auxiliary pump 752. The auxiliary pump 752 is a bi-directional pump that pumps the lubricant from the one or more tanks 704 to the one or more rotating components 37 through the auxiliary supply line 728 regardless of the direction of rotation of the fan shaft 45. The auxiliary pump 752 can include any type of bi-directional pump, such as a positive displacement pump, for example, a piston pump, a gear pump, a generated rotor (gerotor), a rotary pump, a peristaltic pump, or the like. The auxiliary pump 752 pumps the lubricant from the one or more tanks 704 to the one or more rotating components 37 when the fan shaft 45 rotates in a first rotational direction and when the fan shaft 45 rotates in a second rotational direction that is opposite the first rotational direction. For example, the first rotational direction is the rotational direction of the fan shaft 45 when the turbine engine 10 is operating, and the second rotational direction is opposite of the rotational direction of the fan shaft 45 during operation. In this way, the auxiliary lubrication system 720 supplies the lubricant from the one or more tanks 704 to the one or more rotating components 37 during windmilling conditions of the turbine engine 10.

The auxiliary lubrication system 720 includes a clutch 760 that controls the operation of the auxiliary pump 752. For example, the clutch 760 is coupled with the pump shaft 754 and engages the pump shaft 754 to operate the auxiliary pump 752 and disengages the pump shaft 754 to prevent operation of the auxiliary pump 752. The clutch 760 can include any type of clutch for engaging or for disengaging the pump shaft 754. The clutch 760 is an electro-mechanical clutch that is controlled by a lubricant pressure switch 762, a control signal switch 764, and a power supply 766. The lubricant pressure switch 762 and the control signal switch 764 are in communication with the clutch 760, and the power supply 766 is in communication with the lubricant pressure switch 762 and the control signal switch 764. The lubricant pressure switch 762 is in fluid communication with the primary lubrication system 702 through a lubricant pressure signal line 763. The control signal switch 764 is in communication with the controller 100 such that the control signal switch 764 receives a signal from the controller 100 and the controller 100 controls the control signal switch 764. The power supply 766 can be electrical power from the turbine engine 10 (e.g., power that is supplied to the controller 100 or to other systems of the turbine engine 10). In this way, the clutch 760 engages or disengages the pump shaft 754 based on at least one of a pressure of the lubricant in the primary lubrication system 702, a control signal from the controller 100, or a power supply from the power supply 766. Accordingly, the clutch 760 engages the pump shaft 754 to power the auxiliary pump 752 when the fan 38 is windmilling.

The auxiliary feed line 726 includes a first auxiliary branch line 731*a* and a second auxiliary branch line 731*b*. The first auxiliary branch line 731*a* is positioned at a bottom of the one or more tanks 704 such that gravity helps maintain the lubricant in the one or more tanks 704 in fluid communication with the first auxiliary branch line 731*a* during the positive gravity conditions. The second auxiliary branch line 731*b* is positioned approximately at a top of the one or more tanks 704 such that the lubricant is in fluid communication with the second auxiliary branch line 731*b* during the negative gravity conditions. The auxiliary feed line control valve 727 is in communication with the first auxiliary branch line 731*a* and the second auxiliary branch line 731*b*.

The lubrication system 700 operates substantially similar to the lubrication system 600. In normal operating conditions, the primary lubrication system 702 supplies the lubricant from the one or more tanks 704 to the one or more rotating components 37. The lubricant drains from the one or more rotating components 37 into the sump 709. The lubricant is then returned to the one or more tanks 704. In this way, the lubrication system 700 resupplies the lubricant to the one or more rotating components 37 after the lubricant drains from the one or more rotating components 37. During the normal operating conditions, the clutch 760 disengages the pump shaft 754 such that the auxiliary pump 752 does not operate. During windmilling conditions (e.g., when the primary lubrication system 702 is unable to supply the lubricant to the one or more rotating components 37), the clutch 760 engages the pump shaft 754 such that the fan shaft 45 powers the auxiliary pump 752.

The controller 100 determines whether there is a potential lubricant interruption in the lubrication system 700 (e.g., in the primary lubrication system 702 or in the auxiliary lubrication system 720). When the lubrication system 700 is operating in stable operating conditions (e.g., positive gravity conditions, such as, the turbine engine parked on the ground or during level or substantially level flight), the controller 100 controls the auxiliary feed line control valve 727 to open the first auxiliary branch line 731*a* such that the lubricant flows from the one or more tanks 704 through the first auxiliary branch line 731*a* and to the one or more rotating components 37 through the auxiliary feed line 726. The second auxiliary branch line 731*b* is closed during the stable operating conditions. When there is a potential lubricant interruption (e.g., negative gravity conditions, such as, turbine engine acceleration toward the Earth at a rate equal to or greater than the rate of gravity, or decelerating at the end of a vertical assent), the lubricant in the one or more tanks 704 moves towards the top of the one or more tanks 704. In such conditions, the controller 100 controls the auxiliary feed line control valve 727 to open the second auxiliary branch line 731*b* such that the lubricant flows through the second auxiliary branch line 731*b* and to the one or more rotating components 37 through the auxiliary feed line 726. Accordingly, the auxiliary lubrication system 720 supplies the lubricant to the one or more rotating components 37 when the fan 38 is windmilling and there is a potential lubricant interruption in the lubrication system 700 (e.g., the turbine engine 10 is approaching or is operating in the negative gravity conditions).

Figure 8:
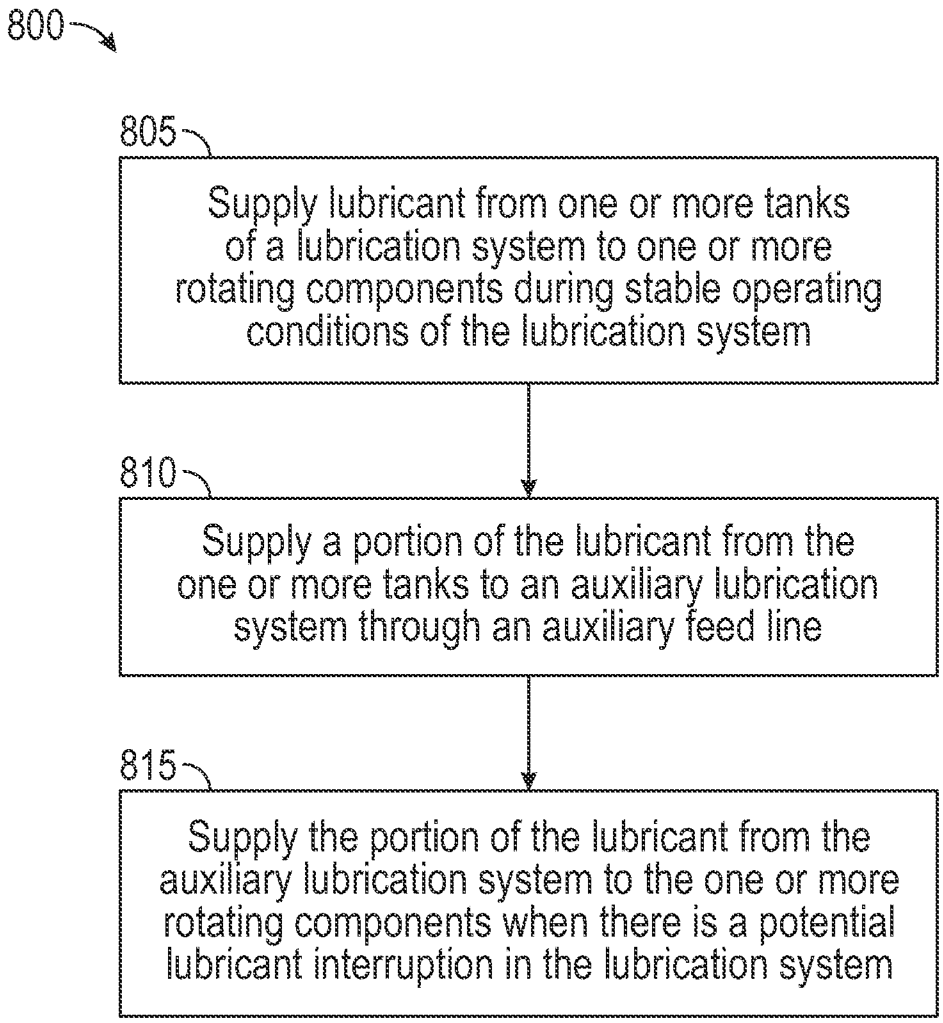
FIG. 8 is a flow diagram of a method of lubricating one or more rotating components of a turbine engine with a lubrication system, according to the present disclosure.

FIG. 8 is a flow diagram of a method 800 of lubricating one or more rotating components 37 of a turbine engine 10 with a lubrication system 200, 300, 400, 500, 600, 700, according to the present disclosure. In step 805, the method 800 includes supplying lubricant from one or more tanks 304, 704 of the lubrication system 200, 300, 400, 500, 600, 700 to the one or more rotating components 37 during stable operating conditions of the lubrication system 200, 300, 400, 500, 600, 700. For example, step 805 may occur when an aircraft comprising the turbine engine is parked on the ground or during level or substantially level flight phases. In step 810, the method 800 includes supplying a portion of the lubricant from the one or more tanks 304, 704 to an auxiliary lubrication system 320, 420, 520, 620, 720 through an auxiliary feed line 326, 426, 526, 626, 726. In step 815, the method 800 includes supplying the portion of the lubricant from the auxiliary lubrication system 320, 420, 520, 620, 720 to the one or more rotating components 37 when there is a potential lubricant interruption in the lubrication system 200, 300, 400, 500, 600, 700. For example, when the aircraft is accelerating toward the Earth or decelerating at the end of a vertical assent, there may be a potential lubricant interruption and auxiliary lubrication system may supply lubricant, as described previously herein. The method 800 can include any of the operations detailed above with respect to FIGS. 1 to 7, respectively.

Accordingly, the lubrication systems detailed herein begin to supply the lubricant to the one or more rotating components prior to an interruption of the lubricant in the lubrication system. In this way, the lubrication systems avoid a potential loss of lubricant pressure, which avoids damage to the one or more rotating components 37 during negative gravity conditions.

As described herein, the lubrication system 300 provides a simple, passive lubrication system. The lubrication system 300 is low weight and reliable. The lubrication system 300 and the lubrication system 600 provide lubrication systems that are dependent on the volume of the accumulator to define the duration of an event that is to be accommodated. The lubrication system 600 and the lubrication system 700 provide actively controlled lubrication systems. Although the lubrication system 600 and the lubrication system 700 may be heavier than the lubrication system 300, the lubrication system 600 and the lubrication system 700 can detect failures of the system (and avoid the potential for a latent failure of the system to go undetected, e.g., if there is leakage in a diaphragm of the accumulator). Furthermore, the lubrication 600 and the lubrication system 700 ensure that the auxiliary system activates before the lubrication pressure in the engine drops. The lubrication system 700 also includes an auxiliary pump that allows the system to operate for extended periods of time, including during engine shutdown events, that may result in the engine windmilling.

Further aspects of the present disclosure are provided by the subject matter of the following clauses.

A lubrication system for a turbine engine includes one or more rotating components, the lubrication system comprising one or more tanks that store lubricant therein, a primary lubrication system supplying the lubricant from the one or more tanks to the one or more rotating components during stable operating conditions of the lubrication system, and an auxiliary lubrication system comprising an auxiliary feed line in fluid communication with the one or more tanks, the auxiliary lubrication system receiving the lubricant from the one or more tanks through the auxiliary feed line, and an auxiliary supply line in fluid communication with the auxiliary feed line and the one or more rotating components, the auxiliary lubrication system supplying the lubricant to the one or more rotating components through the auxiliary supply line when there is a potential lubricant interruption in the lubrication system.

The lubrication system of the preceding clause, the primary lubrication system including a primary pump that pumps the lubricant from the one or more tanks to the one or more rotating components, and a lubricant interruption occurs when the primary pump is unable to pump the lubricant from the one or more tanks.

The lubrication system of any preceding clause, wherein the auxiliary lubrication system begins supplying the lubricant to the one or more rotating components when the potential lubricant interruption occurs.

The lubrication system of any preceding clause, the stable operating conditions of the lubrication system occurring when the turbine engine is operating in positive gravity conditions, and the potential lubricant interruption occurs when the turbine engine is approaching negative gravity conditions.

The lubrication system of any preceding clause, further comprising a controller that controls the auxiliary lubrication system to supply the lubricant to the one or more rotating components when the potential lubricant interruption occurs in the lubrication system.

The lubrication system of any preceding clause, the turbine engine including one or more inertial sensors that sense inertia of the turbine engine, and the controller controls the auxiliary lubrication system to supply the lubricant to the one or more rotating components when the sensed inertia indicates the potential lubricant interruption.

The lubrication system of any preceding clause, the auxiliary lubrication system including an auxiliary accumulator in fluid communication with the auxiliary feed line and the auxiliary supply line, and the auxiliary accumulator fills with a portion of the lubricant from the primary lubrication system during the stable operating conditions and supplies the portion of the lubricant to the one or more rotating components when the potential lubricant interruption occurs.

The lubrication system of any preceding clause, further comprising a pressure source that pressurizes the portion of the lubricant in the auxiliary accumulator to an auxiliary lubricant pressure.

The lubrication system of any preceding clause, the lubricant in the primary lubrication system having a primary lubricant pressure, and the auxiliary lubricant pressure in the auxiliary accumulator is less than the primary lubricant pressure in the primary lubrication system.

The lubrication system of any preceding clause, the auxiliary lubricant pressure in the auxiliary accumulator being in a range of 75% to 95% of the primary lubricant pressure in the primary lubrication system.

The lubrication system of any preceding clause, the one or more rotating components including one or more journal bearings.

The lubrication system of any preceding clause, the turbine engine including a gearbox assembly having one or more gear bearings, and the one or more rotating components include the one or more gear bearings.

The lubrication system of any preceding clause, the gearbox assembly including one or more gears.

The lubrication system of any preceding clause, at least one of the one or more gears including a pin, and the one or more journal bearings are defined between the pin and the at least one of the one or more gears.

The lubrication system of any preceding clause, the turbine engine having one or more shafts and one or more engine bearings that allow the one or more shafts to rotate, and the one or more rotating components include the one or more engine bearings.

The lubrication system of any preceding clause, the primary lubrication system including a primary supply line that is in fluid communication with the one or more tanks and the one or more rotating components for supplying the lubricant from the one or more tanks to the one or more rotating components.

The lubrication system of any preceding clause, the primary lubrication system including a primary supply line check valve that allows the lubricant to flow from the one or more tanks to the one or more rotating components during the stable operating conditions, and prevents the lubricant from flowing to the one or more tanks during the potential lubricant interruption.

The lubrication system of any preceding clause, the auxiliary accumulator including a lubricant bladder disposed therein that stores the lubricant therein and prevents the lubricant from moving to a top of the auxiliary accumulator during the negative gravity conditions.

The lubrication system of any preceding clause, the lubricant bladder being coupled to a bottom of the auxiliary accumulator.

The lubrication system of any preceding clause, the lubricant bladder having a lubricant bladder volume that is less than the auxiliary accumulator volume.

The lubrication system of any preceding clause, the lubricant bladder being expandable such that the lubricant bladder expands when the lubricant fills the lubricant bladder and contracts when the lubricant drains from the lubricant bladder.

The lubrication system of any preceding clause, the one or more tanks having a tank volume, the auxiliary accumulator has an auxiliary accumulator volume, and the auxiliary accumulator volume is 3% to 25% of the tank volume.

The lubrication system of any preceding clause, the auxiliary accumulator volume being equal to or less than 10% of the tank volume.

The lubrication system of any preceding clause, the auxiliary feed line being fluidly coupled to the primary supply line upstream of the primary supply line check valve and downstream of the one or more tanks.

The lubrication system of any preceding clause, the auxiliary supply line being fluidly coupled to the primary supply line downstream of the primary supply line check valve and upstream of the one or more rotating components.

The lubrication system of any preceding clause, the auxiliary lubrication system including an auxiliary feed line check valve in fluid communication with the auxiliary feed line that allows the lubricant to flow from the primary supply line to the auxiliary accumulator during the stable operating conditions to fill the auxiliary accumulator with the lubricant, and prevents the lubricant from flowing to the auxiliary accumulator when the auxiliary accumulator is full of the lubricant.

The lubrication system of any preceding clause, the auxiliary lubrication system including an auxiliary supply line check valve in fluid communication with the auxiliary supply line that allows the lubricant to flow from the auxiliary accumulator to the one or more rotating components during the potential lubricant interruption, and prevents the lubricant from flowing from the auxiliary accumulator during the stable operating conditions.

The lubrication system of any preceding clause, the turbine engine including a high-pressure compressor, and the pressure source is the high-pressure compressor that supplies bleed air to the auxiliary accumulator.

The lubrication system of any preceding clause, the pressure source including a pressurized air supply line, and the pressure source supplies the pressurized air to the auxiliary accumulator through the pressurized air supply line.

The lubrication system of any preceding clause, the pressure source including a pressure source check valve regulates an air pressure of the pressurized air to the auxiliary accumulator at a predetermined air pressure.

The lubrication system of any preceding clause, the auxiliary lubrication system including an auxiliary feed line control valve that is controlled to be opened to allow the lubricant to flow to the auxiliary accumulator and controlled to be closed to prevent the lubricant from flowing to the auxiliary accumulator.

The lubrication system of any preceding clause, the controller that controls the auxiliary feed line control valve.

The lubrication system of any preceding clause, further comprising a lubricant pressure sensor that senses the primary lubricant pressure.

The lubrication system of any preceding clause, further comprising one or more inertial sensors that sense inertia of the turbine engine.

The lubrication system of any preceding clause, the one or more inertial sensors including one or more tri-axial accelerometers that sense gravitational forces on the turbine engine in three perpendicular axes.

The lubrication system of any preceding clause, the one or more inertial sensors including one or more gyroscopes that sense rotational forces of the turbine engine.

The lubrication system of any preceding clause, the controller determining an operating condition of the turbine engine based on the sensed inertia.

The lubrication system of any preceding clause, the controller determining that the operating condition is the positive gravity conditions if the sensed inertia indicates that the gravity on the turbine engine is positive.

The lubrication system of any preceding clause, the controller determining that the operating condition is approaching the negative gravity conditions when the sensed inertia indicates that the gravity on the turbine engine is approaching zero.

The lubrication system of any preceding clause, the controller controlling the auxiliary feed line control valve to open such that the lubricant flows to the auxiliary accumulator if the primary lubrication system is operating in the stable operating conditions.

The lubrication system of any preceding clause, the controller controlling the auxiliary feed line control valve to close to prevent the lubricant from flowing to the auxiliary accumulator when the auxiliary accumulator is full.

The lubrication system of any preceding clause, the controller controlling the auxiliary feed line control valve to open when the operating condition is greater than or equal to an idle condition.

The lubrication system of any preceding clause, the turbine engine including a turbo-engine, and the controller controls the auxiliary feed line control valve to open when a rotational speed of the turbo-engine is greater than a rotational speed threshold.

The lubrication system of any preceding clause, the controller controlling the auxiliary feed line control valve to open when the primary lubricant pressure is less than a lubricant pressure threshold.

The lubrication system of any preceding clause, further comprising a lubricant pressure sensor that senses the primary lubricant pressure, the controller determining the primary lubricant pressure based on the sensed primary lubricant pressure from the lubricant pressure sensor.

The lubrication system of any preceding clause, the auxiliary lubrication system including an auxiliary supply line control valve that is in fluid communication with the auxiliary supply line and is controlled to be opened to allow the lubricant to flow from the auxiliary accumulator to the one or more rotating components, and controlled to be closed to prevent the lubricant from flowing from the auxiliary accumulator to the one or more rotating components.

The lubrication system of any preceding clause, the controller controlling the auxiliary supply line control valve to open and to close.

The lubrication system of any preceding clause, the controller controlling the auxiliary supply line control valve to open such that the lubricant flows from the auxiliary accumulator to the one or more rotating components when there is the potential lubricant interruption.

The lubrication system of any preceding clause, the controller controlling the auxiliary supply line control valve to close such that the lubricant is prevented from flowing from the auxiliary accumulator when the lubrication system is operating in the stable operating conditions.

The lubrication system of any preceding clause, the auxiliary lubrication system including a pressure source control valve in fluid communication with the pressurized air supply line and is controlled to be opened to allow the pressurized air to flow from the pressure source to the auxiliary accumulator, and controlled to be closed to prevent the pressurized air from flowing to the auxiliary accumulator.

The lubrication system of any preceding clause, the controller controlling the pressure source control valve to vary a flow rate of the pressurized air from the pressure source to the auxiliary accumulator.

The lubrication system of any preceding clause, the pressure source being an actuator that is disposed within the auxiliary accumulator.

The lubrication system of any preceding clause, the actuator being controlled to reciprocate within the auxiliary accumulator to pressurize the lubricant in the auxiliary accumulator.

The lubrication system of any preceding clause, the controller controlling the actuator.

The lubrication system of any preceding clause, the actuator including a diaphragm that contacts the lubricant in the auxiliary accumulator to exert a force on the lubricant to pressurize the lubricant.

The lubrication system of any preceding clause, the controller controlling the actuator to reciprocate up when the auxiliary accumulator is empty and the lubrication system is operating in the stable operating conditions such that the auxiliary accumulator fills with the lubricant.

The lubrication system of any preceding clause, the auxiliary lubrication system including an auxiliary pump that pumps the lubricant from the one or more tanks to the one or more rotating components when there is a potential lubricant interruption.

The lubrication system of any preceding clause, the turbine engine including a fan having a fan shaft that rotates, and the auxiliary pump includes a pump shaft that is coupled to the fan shaft such that rotation of the fan shaft causes pump shaft to rotate to power the auxiliary pump.

The lubrication system of any preceding clause, the auxiliary pump being a bi-directional pump such that the auxiliary pump pumps the lubricant in two rotational directions of the pump shaft.

The lubrication system of any preceding clause, the auxiliary lubrication system including a clutch that engages the pump shaft to operate the auxiliary pump and disengages the pump shaft to prevent operation of the auxiliary pump.

The lubrication system of any preceding clause, further comprising a lubricant pressure switch in fluid communication with the primary lubrication system for receiving an indication of the primary lubricant pressure, and is in communication with the clutch.

The lubrication system of any preceding clause, further comprising a control signal switch that is in communication with the controller and the clutch.

The lubrication system of any preceding clause, further comprising a power supply that supplies power to the clutch.

The lubrication system of any preceding clause, the clutch engaging the pump shaft when at least one of the primary lubricant pressure is less than the lubricant pressure threshold, the control switch does not receive a signal from the controller, or the clutch does not receive power from the power supply.

The lubrication system of any preceding clause, the clutch disengaging the pump shaft when the primary lubricant pressure is greater than the lubricant pressure threshold, the control switch receives the signal from the controller, and the clutch receives power from the power supply.

The lubrication system of any preceding clause, the auxiliary feed line including a first auxiliary branch line and a second auxiliary branch line.

The lubrication system of any preceding clause, the first auxiliary branch line being fluidly coupled to a bottom of the one or more tanks such that gravity helps maintain the lubricant in fluid communication with the first auxiliary branch line during the stable operating conditions.

The lubrication system of any preceding clause, the second auxiliary branch line being fluidly coupled approximately at a top of the one or more tanks such that the lubricant is in fluid communication with the second auxiliary branch line during the negative gravity conditions.

The lubrication system of any preceding clause, the auxiliary feed line control valve being in fluid communication with the first auxiliary branch line and the second auxiliary branch line.

The lubrication system of any preceding clause, the controller controlling the auxiliary feed line control valve to open the first auxiliary branch line during the stable operating conditions such that the lubricant flows from the one or more tanks to the one or more rotating components through the first auxiliary branch line.

The lubrication system of any preceding clause, the controller controlling the auxiliary feed line control valve to open the second auxiliary branch line during the potential lubricant interruption such that the lubricant flows from the one or more tanks to the one or more rotating components through the second auxiliary branch line.

A turbine engine comprises a turbo-engine including a shaft, a fan drivingly coupled to the shaft of the turbo-engine, rotation of the shaft causing the fan to rotate, one or more rotating components in at least one of the turbo-engine or the fan, and a lubrication system for lubricating the one or more rotating components, the lubrication system comprising one or more tanks that store lubricant therein a primary lubrication system supplying the lubricant from the one or more tanks to the one or more rotating components during stable operating conditions of the lubrication system, and an auxiliary lubrication system comprising an auxiliary feed line in fluid communication with the one or more tanks, the auxiliary lubrication system receiving the lubricant from the one or more tanks through the auxiliary feed line, and an auxiliary supply line in fluid communication with the auxiliary feed line and the one or more rotating components, the auxiliary lubrication system supplying the lubricant to the one or more rotating components through the auxiliary supply line when there is a potential lubricant interruption in the lubrication system.

The turbine engine of the preceding clause, the primary lubrication system including a primary pump that pumps the lubricant from the one or more tanks to the one or more rotating components, and a lubricant interruption occurs when the primary pump is unable to pump the lubricant from the one or more tanks.

The turbine engine of any preceding clause, wherein the auxiliary lubrication system begins supplying the lubricant to the one or more rotating components when the potential lubricant interruption occurs.

The turbine engine of any preceding clause, the stable operating conditions of the lubrication system occurring when the turbine engine is operating in positive gravity conditions, and the potential lubricant interruption occurs when the turbine engine is approaching negative gravity conditions.

The turbine engine of any preceding clause, further comprising a controller that controls the auxiliary lubrication system to supply the lubricant to the one or more rotating components when the potential lubricant interruption occurs in the lubrication system.

The turbine engine of any preceding clause, further comprising one or more inertial sensors that sense inertia of the turbine engine, the controller controlling the auxiliary lubrication system to supply the lubricant to the one or more rotating components when the sensed inertia indicates the potential lubricant interruption.

The turbine engine of any preceding clause, the auxiliary lubrication system including an auxiliary accumulator in fluid communication with the auxiliary feed line and the auxiliary supply line, and the auxiliary accumulator fills with a portion of the lubricant from the primary lubrication system during the stable operating conditions and supplies the portion of the lubricant to the one or more rotating components when the potential lubricant interruption occurs.

The turbine engine of any preceding clause, further comprising a pressure source that pressurizes the portion of the lubricant in the auxiliary accumulator to an auxiliary lubricant pressure.

The turbine engine of any preceding clause, the lubricant in the primary lubrication system having a primary lubricant pressure, and the auxiliary lubricant pressure in the auxiliary accumulator is less than the primary lubricant pressure in the primary lubrication system.

The turbine engine of any preceding clause, the auxiliary lubricant pressure in the auxiliary accumulator being in a range of 75% to 95% of the primary lubricant pressure in the primary lubrication system.

The turbine engine of any preceding clause, the lubrication system being the lubrication system of any preceding clause.

A method of lubricating one or more rotating components of a turbine engine with a lubrication system, the method comprising supplying lubricant from one or more tanks of a primary lubrication system to the one or more rotating components during stable operating conditions of the lubrication system, supplying a portion of the lubricant from the one or more tanks to an auxiliary lubrication system through an auxiliary feed line, and supplying the portion of the lubricant from the auxiliary lubrication system to the one or more rotating components when there is a potential lubricant interruption in the lubrication system.

The method of the preceding clause, further comprising pumping, with a primary pump, the lubricant from the one or more tanks to the one or more rotating components, and a lubricant interruption occurs when the primary pump is unable to pump the lubricant from the one or more tanks.

The method of any preceding clause, further comprising beginning to supply the lubricant to the one or more rotating components when the potential lubricant interruption occurs.

The method of any preceding clause, the stable operating conditions of the lubrication system occurring when the turbine engine is operating in positive gravity conditions, and the potential lubricant interruption occurs when the turbine engine is approaching negative gravity conditions.

The method of any preceding clause, further comprising controlling the lubrication system with a controller to supply the lubricant to the one or more rotating components when the potential lubricant interruption occurs in the lubrication system.

The method of any preceding clause, further comprising sensing inertia of the turbine with one or more inertial sensors, and supplying the lubricant to the one or more rotating components when the sensed inertia indicates the potential lubricant interruption.

The method of any preceding clause, further comprising filling an auxiliary accumulator with the portion of the lubricant from the lubrication system during the stable operating conditions, and supplying the portion of the lubricant to the one or more rotating components when the potential lubricant interruption occurs.

The method of any preceding clause, further comprising pressurizing the portion of the lubricant in the auxiliary accumulator to an auxiliary lubricant pressure with a pressure source.

The method of any preceding clause, the lubricant in the primary lubrication system having a primary lubricant pressure in a primary lubrication system, and the method further comprises pressurizing the portion of the lubricant in the auxiliary accumulator such that the auxiliary lubricant pressure in the auxiliary accumulator is less than the primary lubricant pressure in the primary lubrication system.

The method of any preceding clause, further comprising pressurizing the portion of the lubricant such that the auxiliary lubricant pressure in the auxiliary accumulator is in a range of 75% to 95% of the primary lubricant pressure in the primary lubrication system.

The method of any preceding clause, the one or more rotating components including one or more journal bearings.

The method of any preceding clause, the turbine engine including a gearbox assembly having one or more gear bearings, and the one or more rotating components include the one or more gear bearings.

The method of any preceding clause, the gearbox assembly including one or more gears.

The method of any preceding clause, at least one of the one or more gears including a pin, and the one or more journal bearings are defined between the pin and the at least one of the one or more gears.

The method of any preceding clause, the turbine engine having one or more shafts and one or more engine bearings that allow the one or more shafts to rotate, and the one or more rotating components include the one or more engine bearings.

The method of any preceding clause, the primary lubrication system including a primary supply line that is in fluid communication with the one or more tanks and the one or more rotating components for supplying the lubricant from the one or more tanks to the one or more rotating components.

The method of any preceding clause, the primary lubrication system including a primary supply line check valve, and the method further comprises opening the primary supply line check valve to allow the lubricant to flow from the one or more tanks to the one or more rotating components during the stable operating conditions, and closing the primary supply line check valve to prevent the lubricant from flowing to the one or more tanks during the potential lubricant interruption.

The method of any preceding clause, the auxiliary accumulator including a lubricant bladder disposed therein that stores the lubricant therein and prevents the lubricant from moving to a top of the auxiliary accumulator during the negative gravity conditions.

The method of any preceding clause, the lubricant bladder being coupled to a bottom of the auxiliary accumulator.

The method of any preceding clause, the lubricant bladder having a lubricant bladder volume that is less than the auxiliary accumulator volume.

The method of any preceding clause, the lubricant bladder being expandable, and the method further comprises expanding the lubricant bladder when the lubricant fills the lubricant bladder and contracting the lubricant bladder when the lubricant drains from the lubricant bladder.

The method of any preceding clause, the one or more tanks having a tank volume, the auxiliary accumulator has an auxiliary accumulator volume, and the auxiliary accumulator volume is 3% to 25% of the tank volume.

The method of any preceding clause, the auxiliary accumulator volume being equal to or less than 10% of the tank volume.

The method of any preceding clause, the auxiliary feed line being fluidly coupled to the primary supply line upstream of the primary supply line check valve and downstream of the one or more tanks.

The method of any preceding clause, the auxiliary supply line being fluidly coupled to the primary supply line downstream of the primary supply line check valve and upstream of the one or more rotating components.

The method of any preceding clause, the auxiliary lubrication system including an auxiliary feed line check valve in fluid communication with the auxiliary feed line, and the method further comprises allowing, with the auxiliary feed line check valve, the lubricant to flow from the primary supply line to the auxiliary accumulator during the stable operating conditions to fill the auxiliary accumulator with the lubricant, and preventing, with the auxiliary feed line check valve, the lubricant from flowing to the auxiliary accumulator when the auxiliary accumulator is full of the lubricant.

The method of any preceding clause, the auxiliary lubrication system including an auxiliary supply line check valve in fluid communication with the auxiliary supply line, and the method further comprises allowing, with the auxiliary supply line check valve, the lubricant to flow from the auxiliary accumulator to the one or more rotating components during the potential lubricant interruption, and preventing, with the auxiliary supply line check valve, the lubricant from flowing from the auxiliary accumulator during the stable operating conditions.

The method of any preceding clause, the turbine engine including a high-pressure compressor, and the pressure source is the high-pressure compressor, and the method further comprises supplying, with the high-pressure compressor, bleed air to the auxiliary accumulator.

The method of any preceding clause, the pressure source including a pressurized air supply line, and the pressure source supplies the pressurized air to the auxiliary accumulator through the pressurized air supply line.

The method of any preceding clause, the pressure source including a pressure source check valve, and the method further comprises regulating, with the pressure source check valve, an air pressure of the pressurized air to the auxiliary accumulator at a predetermined air pressure.

The method of any preceding clause, the auxiliary lubrication system including an auxiliary feed line control valve, and the method further comprises opening the auxiliary feed line control valve to allow the lubricant to flow to the auxiliary accumulator, and closing the auxiliary feed line control valve to prevent the lubricant from flowing to the auxiliary accumulator.

The method of any preceding clause, further comprising sensing, with a lubricant pressure sensor, the primary lubricant pressure.

The method of any preceding clause, further comprising sensing, with one or more inertial sensors, inertia of the turbine engine.

The method of any preceding clause, the one or more inertial sensors including one or more tri-axial accelerometers that sense gravitational forces on the turbine engine in three perpendicular axes.

The method of any preceding clause, the one or more inertial sensors including one or more gyroscopes that sense rotational forces of the turbine engine.

The method of any preceding clause, further comprising determining an operating condition of the turbine engine based on the sensed inertia.

The method of any preceding clause, further comprising determining that the operating condition is the positive gravity conditions if the sensed inertia indicates that the gravity on the turbine engine is positive.

The method of any preceding clause, further comprising determining that the operating condition is approaching the negative gravity conditions when the sensed inertia indicates that the gravity on the turbine engine is approaching zero.

The method of any preceding clause, further comprising opening the auxiliary feed line control valve such that the lubricant flows to the auxiliary accumulator if the primary lubrication system is operating in the stable operating conditions.

The method of any preceding clause, further comprising closing the auxiliary feed line control valve to prevent the lubricant from flowing to the auxiliary accumulator when the auxiliary accumulator is full.

The method of any preceding clause, further comprising opening the auxiliary feed line control valve when the operating condition is greater than or equal to an idle condition.

The method of any preceding clause, the turbine engine including a turbo-engine, and the method further comprises opening the auxiliary feed line control valve when a rotational speed of the turbo-engine is greater than a rotational speed threshold.

The method of any preceding clause, further comprising opening the auxiliary feed line control valve when the primary lubricant pressure is less than a lubricant pressure threshold.

The method of any preceding clause, further comprising sensing, with a lubricant pressure sensor, the primary lubricant pressure, and determining the primary lubricant pressure based on the sensed primary lubricant pressure from the lubricant pressure sensor.

The method of any preceding clause, the auxiliary lubrication system including an auxiliary supply line control valve that is in fluid communication with the auxiliary supply line, and the method further comprises opening the auxiliary supply line control valve to allow the lubricant to flow from the auxiliary accumulator to the one or more rotating components, and closing the auxiliary supply line control valve to prevent the lubricant from flowing from the auxiliary accumulator to the one or more rotating components.

The method of any preceding clause, further comprising controlling the auxiliary supply line control valve to open and to close with a controller.

The method of any preceding clause, further comprising opening the auxiliary supply line control valve such that the lubricant flows from the auxiliary accumulator to the one or more rotating components when there is the potential lubricant interruption.

The method of any preceding clause, further comprising closing the auxiliary supply line control valve such that the lubricant is prevented from flowing from the auxiliary accumulator when the lubrication system is operating in the stable operating conditions.

The method of any preceding clause, the auxiliary lubrication system including a pressure source control valve in fluid communication with the pressurized air supply line, and the method further comprises opening the pressure source control valve to allow the pressurized air to flow from the pressure source to the auxiliary accumulator, and closing the pressure source control valve to prevent the pressurized air from flowing to the auxiliary accumulator.

The method of any preceding clause, further comprising controlling the pressure source control valve to vary a flow rate of the pressurized air from the pressure source to the auxiliary accumulator.

The method of any preceding clause, the pressure source being an actuator that is disposed within the auxiliary accumulator.

The method of any preceding clause, further comprising reciprocating the actuator within the auxiliary accumulator to pressurize the lubricant in the auxiliary accumulator.

The method of any preceding clause, further comprising controlling the actuator with the controller.

The method of any preceding clause, the actuator including a diaphragm that contacts the lubricant in the auxiliary accumulator to exert a force on the lubricant to pressurize the lubricant.

The method of any preceding clause, further comprising reciprocating the actuator up when the auxiliary accumulator is empty and the lubrication system is operating in the stable operating conditions such that the auxiliary accumulator fills with the lubricant.

The method of any preceding clause, the auxiliary lubrication system including an auxiliary pump, and the method further comprises pumping, with the auxiliary pump, the lubricant from the one or more tanks to the one or more rotating components when there is a potential lubricant interruption.

The method of any preceding clause, the turbine engine including a fan having a fan shaft that rotates, and the auxiliary pump includes a pump shaft that is coupled to the fan shaft such that rotation of the fan shaft causes pump shaft to rotate to power the auxiliary pump.

The method of any preceding clause, the auxiliary pump being a bi-directional pump such that the auxiliary pump pumps the lubricant in two rotational directions of the pump shaft.

The method of any preceding clause, the auxiliary lubrication system including a clutch, and the method further comprises engaging the pump shaft with the clutch to operate the auxiliary pump, and disengaging the pump shaft with the clutch to prevent operation of the auxiliary pump.

The method of any preceding clause, further comprising a lubricant pressure switch in fluid communication with the primary lubrication system for receiving an indication of the primary lubricant pressure, and is in communication with the clutch.

The method of any preceding clause, further comprising a control signal switch that is in communication with the controller and the clutch.

The method of any preceding clause, further comprising a power supply that supplies power to the clutch.

The method of any preceding clause, further comprising engaging the pump shaft with the clutch when at least one of the primary lubricant pressure is less than the lubricant pressure threshold, the control switch does not receive a signal from the controller, or the clutch does not receive power from the power supply.

The method of any preceding clause, further comprising disengaging the pump shaft with clutch when the primary lubricant pressure is greater than the lubricant pressure threshold, the control switch receives the signal from the controller, and the clutch receives power from the power supply.

The method of any preceding clause, the auxiliary feed line including a first auxiliary branch line and a second auxiliary branch line.

The method of any preceding clause, the first auxiliary branch line being fluidly coupled to a bottom of the one or more tanks such that gravity helps maintain the lubricant in fluid communication with the first auxiliary branch line during the stable operating conditions.

The method of any preceding clause, the second auxiliary branch line being fluidly coupled approximately at a top of the one or more tanks such that the lubricant is in fluid communication with the second auxiliary branch line during the negative gravity conditions.

The method of any preceding clause, the auxiliary feed line control valve being in fluid communication with the first auxiliary branch line and the second auxiliary branch line.

The method of any preceding clause, further comprising opening, with the auxiliary feed line control valve, the first auxiliary branch line during the stable operating conditions such that the lubricant flows from the one or more tanks to the one or more rotating components through the first auxiliary branch line.

The method of any preceding clause, further comprising opening, with the auxiliary feed line control valve, the second auxiliary branch line during the potential lubricant interruption such that the lubricant flows from the one or more tanks to the one or more rotating components through the second auxiliary branch line.

Although the foregoing description is directed to certain embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. A lubrication system for a turbine engine, the turbine engine including one or more rotating components, the lubrication system comprising:

one or more tanks that store lubricant therein;

a primary lubrication system supplying the lubricant from the one or more tanks to the one or more rotating components during stable operating conditions of the lubrication system;

an auxiliary lubrication system comprising:

an auxiliary feed line in fluid communication with the one or more tanks, wherein the auxiliary lubrication system receives the lubricant from the one or more tanks through the auxiliary feed line; and an auxiliary supply line in fluid communication with the auxiliary feed line and the one or more rotating components to deliver the lubricant from the auxiliary feed line to the one or more rotating components;

one or more inertial sensors to sense inertia of the turbine engine; and a controller configured to receive the sensed inertia from the one or more inertial sensors in order to determine whether the turbine engine is operating in a stable operating condition and to predict a lubricant interruption, each being based on the sensed inertia, and to control the auxiliary lubrication system to supply the lubricant to the one or more rotating components through the auxiliary supply line upon predicting the lubricant interruption.

2. The lubrication system of claim 1, wherein the primary lubrication system includes a primary pump that pumps the lubricant from the one or more tanks to the one or more rotating components, and a lubricant interruption occurs when the primary pump is unable to pump the lubricant from the one or more tanks.

3. The lubrication system of claim 1, wherein the controller is configured to determine stable operating conditions of the lubrication system when the one or more inertial sensors sense positive gravity conditions, and configured to determine the lubricant interruption when the one or more inertial sensors sense gravity conditions approaching zero.

4. The lubrication system of claim 1, wherein the auxiliary lubrication system includes an auxiliary accumulator in fluid communication with the auxiliary feed line and the auxiliary supply line, and the auxiliary accumulator fills with a portion of the lubricant from the primary lubrication system during the stable operating conditions and supplies the portion of the lubricant to the one or more rotating components when the lubricant interruption occurs.

5. The lubrication system of claim 4, further comprising a pressure source that pressurizes the portion of the lubricant in the auxiliary accumulator to an auxiliary lubricant pressure.

6. The lubrication system of claim 5, wherein the lubricant in the primary lubrication system has a primary lubricant pressure, and the auxiliary lubricant pressure in the auxiliary accumulator is less than the primary lubricant pressure in the primary lubrication system.

7. The lubrication system of claim 6, wherein the auxiliary lubricant pressure in the auxiliary accumulator is in a range of 75% to 95% of the primary lubricant pressure in the primary lubrication system.

8. A turbine engine comprising:

a turbo-engine including a shaft;

a fan drivingly coupled to the shaft of the turbo-engine, wherein rotation of the shaft causes the fan to rotate;

one or more rotating components in at least one of the turbo-engine or the fan; and a lubrication system for lubricating the one or more rotating components, the lubrication system comprising:

one or more tanks that store lubricant therein;

a primary lubrication system supplying the lubricant from the one or more tanks to the one or more rotating components during stable operating conditions of the lubrication system;

an auxiliary lubrication system comprising:

an auxiliary feed line in fluid communication with the one or more tanks, wherein the auxiliary lubrication system receives the lubricant from the one or more tanks through the auxiliary feed line; and an auxiliary supply line in fluid communication with the auxiliary feed line and the one or more rotating components;

one or more inertial sensors to sense inertia of the turbine engine; and a controller configured to receive the sensed inertia from the one or more inertial sensors in order to determine whether the turbine engine is operating in a stable operating condition and to predict a lubricant interruption, each being based on the sensed inertia, and to control the auxiliary lubrication system to supply the lubricant to the one or more rotating components through the auxiliary supply line upon predicting the lubricant interruption.

9. The turbine engine of claim 8, wherein the primary lubrication system includes a primary pump that pumps the lubricant from the one or more tanks to the one or more rotating components, and a lubricant interruption occurs when the primary pump is unable to pump the lubricant from the one or more tanks.

10. The turbine engine of claim 8, wherein the controller is configured to determine stable operating conditions of the lubrication system when the one or more inertial sensors sense positive gravity conditions, and configured to determine the lubricant interruption when the one or more inertial sensors sense gravity conditions approaching zero.

11. The turbine engine of claim 8, wherein the auxiliary lubrication system includes an auxiliary accumulator in fluid communication with the auxiliary feed line and the auxiliary supply line, and the auxiliary accumulator fills with a portion of the lubricant from the primary lubrication system during the stable operating conditions and supplies the portion of the lubricant to the one or more rotating components when the lubricant interruption occurs.

12. The turbine engine of claim 11, further comprising a pressure source that pressurizes the portion of the lubricant in the auxiliary accumulator to an auxiliary lubricant pressure.

13. The turbine engine of claim 12, wherein the lubricant in the primary lubrication system has a primary lubricant pressure, and the auxiliary lubricant pressure in the auxiliary accumulator is less than the primary lubricant pressure in the primary lubrication system.

14. The turbine engine of claim 13, wherein the auxiliary lubricant pressure in the auxiliary accumulator is in a range of 75% to 95% of the primary lubricant pressure in the primary lubrication system.

15. The lubrication system of claim 1, wherein the one or more inertial sensors comprise one or more gyroscopes that sense rotational forces of the turbine engine.

16. The lubrication system of claim 1, wherein the one or more inertial sensors comprise one or more tri-axial accelerometers that sense gravitational forces on the turbine engine in three perpendicular axes.

17. The lubrication system of claim 5, wherein the pressure source supplies pressurized air to the auxiliary accumulator.

18. The turbine engine of claim 8, wherein the one or more inertial sensors comprise one or more gyroscopes that sense rotational forces of the turbine engine.

19. The turbine engine of claim 8, wherein the one or more inertial sensors comprise one or more tri-axial accelerometers that sense gravitational forces on the turbine engine in three perpendicular axes.

20. The turbine engine of claim 12, wherein the pressure source supplies pressurized air to the auxiliary accumulator.

* * * * *